(12) United States Patent
Jhang et al.

(10) Patent No.: US 11,543,625 B2
(45) Date of Patent: Jan. 3, 2023

(54) OPTICAL IMAGING LENS

(71) Applicant: Genius Electronic Optical (Xiamen) Co., Ltd., Fujian (CN)

(72) Inventors: Jia-Sin Jhang, Taichung (TW); Yongfeng Lai, Fujian (CN); Baina Chen, Fujian (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 324 days.

(21) Appl. No.: 16/849,762

(22) Filed: Apr. 15, 2020

(65) Prior Publication Data

US 2021/0199924 A1    Jul. 1, 2021

(30) Foreign Application Priority Data

Dec. 31, 2019   (CN) .......................... 201911407999.0

(51) Int. Cl.
| | |
|---|---|
| *G02B 9/62* | (2006.01) |
| *G02B 13/00* | (2006.01) |
| *G02B 27/00* | (2006.01) |

(52) U.S. Cl.
CPC ........... *G02B 9/62* (2013.01); *G02B 13/0045* (2013.01); *G02B 27/0025* (2013.01)

(58) Field of Classification Search
None
See application file for complete search history.

(56) References Cited

U.S. PATENT DOCUMENTS

| | | | | |
|---|---|---|---|---|
| 2015/0138425 | A1* | 5/2015 | Lee | G02B 13/0015 348/335 |
| 2018/0052303 | A1* | 2/2018 | Tang | G02B 13/18 |
| 2019/0391367 | A1* | 12/2019 | Kuo | G02B 9/62 |

\* cited by examiner

*Primary Examiner* — Darryl J Collins
(74) *Attorney, Agent, or Firm* — Chen Yoshimura LLP

(57) ABSTRACT

The present invention provides an optical imaging lens. The optical imaging lens comprises six lens elements positioned in an order from an object side to an image side. Through controlling convex or concave shape of surfaces of the lens elements and designing parameters satisfying at least one inequality, the optical imaging lens may present a great angle of view with smaller surface area of the front side of the optical imaging lens.

19 Claims, 37 Drawing Sheets

| Embodiment 1 |||||||
|---|---|---|---|---|---|---|
| EFL = 3.786 mm ; HFOV = 40.051 dgrees ; TTL = 4.624 mm |||||||
| Fno = 2.221 ; Image Height = 3.323 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.116 | | | | |
| L1A1 | 1st lens element | 1.740 | 0.907 | 1.545 | 55.987 | 2.728 | Plastic |
| L1A2 | | -8.477 | 0.045 | | | | |
| L2A1 | 2nd lens element | 35.512 | 0.228 | 1.661 | 20.373 | -5.674 | Plastic |
| L2A2 | | 3.412 | 0.337 | | | | |
| L3A1 | 3rd lens element | -10.313 | 0.271 | 1.545 | 55.987 | -15.886 | Plastic |
| L3A2 | | 55.244 | 0.070 | | | | |
| L4A1 | 4th lens element | 4.716 | 0.353 | 1.640 | 23.529 | -30.706 | Plastic |
| L4A2 | | 3.697 | 0.252 | | | | |
| L5A1 | 5th lens element | 5.103 | 0.467 | 1.545 | 55.987 | 1.801 | Plastic |
| L5A2 | | -1.179 | 0.203 | | | | |
| L6A1 | 6th lens element | -2.454 | 0.403 | 1.545 | 55.987 | -1.601 | Plastic |
| L6A2 | | 1.438 | 0.700 | | | | |
| TFA1 | Filtering unit | INFINITY | 0.210 | 1.517 | 64.167 | | |
| TFA2 | | INFINITY | 0.178 | | | | |
| IMA | Image plane | INFINITY | | | | | |

FIG. 8

| Embodiment 1 ||||
|---|---|---|---|---|
| Aspherical Parameters |||||
| Surface # | K | a2 | a4 | a6 |
| L1A1 | 0.000000E+00 | 0.000000E+00 | -1.669252E-02 | 1.550834E-02 |
| L1A2 | 0.000000E+00 | 0.000000E+00 | -7.950470E-02 | 9.220658E-02 |
| L2A1 | 0.000000E+00 | 0.000000E+00 | -4.526384E-02 | 1.412507E-01 |
| L2A2 | 1.043358E+01 | 0.000000E+00 | -3.117964E-02 | 7.219791E-02 |
| L3A1 | 0.000000E+00 | 0.000000E+00 | -9.845265E-02 | -6.340643E-02 |
| L3A2 | 0.000000E+00 | 0.000000E+00 | -8.764738E-02 | -5.628921E-02 |
| L4A1 | 0.000000E+00 | 0.000000E+00 | -1.743030E-01 | 2.363431E-01 |
| L4A2 | 0.000000E+00 | 0.000000E+00 | -2.624396E-01 | 2.284715E-01 |
| L5A1 | 0.000000E+00 | 0.000000E+00 | -8.722549E-02 | -2.279099E-02 |
| L5A2 | -5.517475E+00 | 0.000000E+00 | 9.317987E-03 | -3.535786E-03 |
| L6A1 | 0.000000E+00 | 0.000000E+00 | -5.956252E-02 | 3.444317E-02 |
| L6A2 | -1.126729E+01 | 0.000000E+00 | -1.163887E-01 | 8.550295E-02 |
| Surface # | a8 | a10 | a12 | a14 |
| L1A1 | -1.198070E-01 | 1.522672E-01 | -1.454336E-02 | -1.848095E-01 |
| L1A2 | -4.513519E-01 | 6.889153E-01 | -2.001453E-01 | -3.659558E-01 |
| L2A1 | -4.354016E-01 | 4.834469E-01 | 3.415291E-01 | -8.630371E-01 |
| L2A2 | -1.504107E-01 | 1.039176E-01 | 1.533221E-02 | 1.329144E-02 |
| L3A1 | -8.079404E-03 | -1.603993E-01 | 8.647951E-01 | -1.447572E+00 |
| L3A2 | -1.206077E-01 | -2.475204E-01 | 9.424767E-01 | -9.328103E-01 |
| L4A1 | -4.252937E-01 | 2.537711E-01 | -4.435890E-02 | 1.935854E-02 |
| L4A2 | -1.456981E-01 | -1.358481E-02 | 5.292193E-02 | -1.663686E-02 |
| L5A1 | 2.219429E-02 | -1.677055E-02 | -1.885010E-03 | 1.179718E-03 |
| L5A2 | 2.538560E-03 | -2.752050E-04 | 4.671390E-04 | -2.147454E-04 |
| L6A1 | 1.056665E-02 | -8.141504E-03 | 1.692182E-03 | -1.197737E-04 |
| L6A2 | -4.967967E-02 | 1.997010E-02 | -5.509565E-03 | 1.002051E-03 |
| Surface # | a16 | a18 | a20 | |
| L1A1 | 1.229763E-01 | | | |
| L1A2 | 2.356353E-01 | | | |
| L2A1 | 3.910562E-01 | | | |
| L2A2 | -3.342996E-02 | | | |
| L3A1 | 8.463289E-01 | | | |
| L3A2 | 3.304333E-01 | | | |
| L4A1 | -1.688164E-02 | | | |
| L4A2 | 9.862949E-04 | | | |
| L5A1 | 1.171194E-03 | 1.022857E-04 | -1.539584E-04 | |
| L5A2 | -9.030083E-05 | 5.228416E-05 | -6.230161E-06 | |
| L6A1 | -1.118479E-06 | -1.449158E-07 | 6.569176E-08 | |
| L6A2 | -1.144700E-04 | 7.561917E-06 | -2.247284E-07 | |

FIG. 9

| Embodiment 2 ||||||||
|---|---|---|---|---|---|---|---|
| EFL = 3.797 mm ; HFOV = 38.994 dgrees ; TTL = 4.748 mm ||||||||
| Fno = 2.227 ; Image Height = 3.210 mm ||||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.150 | | | | |
| L1A1 | 1st lens element | 1.715 | 0.931 | 1.545 | 55.987 | 2.724 | Plastic |
| L1A2 | | -9.099 | 0.027 | | | | |
| L2A1 | 2nd lens element | 41.681 | 0.350 | 1.661 | 20.373 | -5.593 | Plastic |
| L2A2 | | 3.413 | 0.267 | | | | |
| L3A1 | 3rd lens element | -607.935 | 0.319 | 1.545 | 55.987 | -15.606 | Plastic |
| L3A2 | | 8.648 | 0.043 | | | | |
| L4A1 | 4th lens element | 4.362 | 0.361 | 1.640 | 23.529 | -27.858 | Plastic |
| L4A2 | | 3.395 | 0.128 | | | | |
| L5A1 | 5th lens element | 4.878 | 0.783 | 1.545 | 55.987 | 1.802 | Plastic |
| L5A2 | | -1.163 | 0.146 | | | | |
| L6A1 | 6th lens element | -2.438 | 0.402 | 1.545 | 55.987 | -1.575 | Plastic |
| L6A2 | | 1.407 | 0.700 | | | | |
| TFA1 | Filtering unit | INFINITY | 0.210 | 1.517 | 64.167 | | |
| TFA2 | | INFINITY | 0.081 | | | | |
| IMA | Image plane | INFINITY | | | | | |

FIG. 12

| Embodiment 2 |||||
|---|---|---|---|---|
| Aspherical Parameters |||||
| Surface # | K | a2 | a4 | a6 |
| L1A1 | 0.000000E+00 | 0.000000E+00 | -1.813354E-02 | 2.768428E-02 |
| L1A2 | 0.000000E+00 | 0.000000E+00 | -9.217865E-02 | 9.699080E-02 |
| L2A1 | 0.000000E+00 | 0.000000E+00 | -5.649135E-02 | 1.361910E-01 |
| L2A2 | 1.045713E+01 | 0.000000E+00 | -3.651466E-02 | 6.888020E-02 |
| L3A1 | 0.000000E+00 | 0.000000E+00 | -8.066927E-02 | -2.754870E-02 |
| L3A2 | 0.000000E+00 | 0.000000E+00 | -7.190541E-02 | -4.958008E-02 |
| L4A1 | 0.000000E+00 | 0.000000E+00 | -1.821514E-01 | 2.303609E-01 |
| L4A2 | 0.000000E+00 | 0.000000E+00 | -2.519852E-01 | 2.303840E-01 |
| L5A1 | 0.000000E+00 | 0.000000E+00 | -8.317712E-02 | -2.300695E-02 |
| L5A2 | -5.817971E+00 | 0.000000E+00 | 1.579801E-02 | -3.468185E-03 |
| L6A1 | 0.000000E+00 | 0.000000E+00 | -5.923670E-02 | 3.445555E-02 |
| L6A2 | -1.151722E+01 | 0.000000E+00 | -1.189939E-01 | 8.579334E-02 |
| Surface # | a8 | a10 | a12 | a14 |
| L1A1 | -1.496420E-01 | 1.978639E-01 | -2.690434E-02 | -2.062538E-01 |
| L1A2 | -4.404728E-01 | 6.819895E-01 | -1.809545E-01 | -3.700098E-01 |
| L2A1 | -4.436644E-01 | 4.931908E-01 | 3.408302E-01 | -8.645396E-01 |
| L2A2 | -1.558686E-01 | 8.517347E-02 | 6.394070E-03 | 2.063078E-02 |
| L3A1 | 1.089892E-02 | -1.700428E-01 | 8.506368E-01 | -1.469593E+00 |
| L3A2 | -1.053367E-01 | -2.434475E-01 | 9.282135E-01 | -9.460229E-01 |
| L4A1 | -4.280042E-01 | 2.530843E-01 | -4.754248E-02 | 1.723955E-02 |
| L4A2 | -1.461710E-01 | -1.424890E-02 | 5.259301E-02 | -1.663592E-02 |
| L5A1 | 2.355834E-02 | -1.542043E-02 | -1.429595E-03 | 1.371952E-03 |
| L5A2 | 2.341740E-03 | -2.498962E-04 | 4.764733E-04 | -2.128912E-04 |
| L6A1 | 1.056882E-02 | -8.139313E-03 | 1.692714E-03 | -1.196881E-04 |
| L6A2 | -4.962963E-02 | 1.997369E-02 | -5.509444E-03 | 1.002043E-03 |
| Surface # | a16 | a18 | a20 | |
| L1A1 | 1.355993E-01 | | | |
| L1A2 | 2.166535E-01 | | | |
| L2A1 | 3.897246E-01 | | | |
| L2A2 | -3.199337E-02 | | | |
| L3A1 | 8.068333E-01 | | | |
| L3A2 | 3.341773E-01 | | | |
| L4A1 | -1.534573E-02 | | | |
| L4A2 | 1.085010E-03 | | | |
| L5A1 | 1.225606E-03 | 7.111405E-05 | -1.848018E-04 | |
| L5A2 | -9.016846E-05 | 5.244265E-05 | -6.242977E-06 | |
| L6A1 | -1.108544E-06 | -1.442823E-07 | 6.545881E-08 | |
| L6A2 | -1.144748E-04 | 7.561547E-06 | -2.247276E-07 | |

FIG. 13

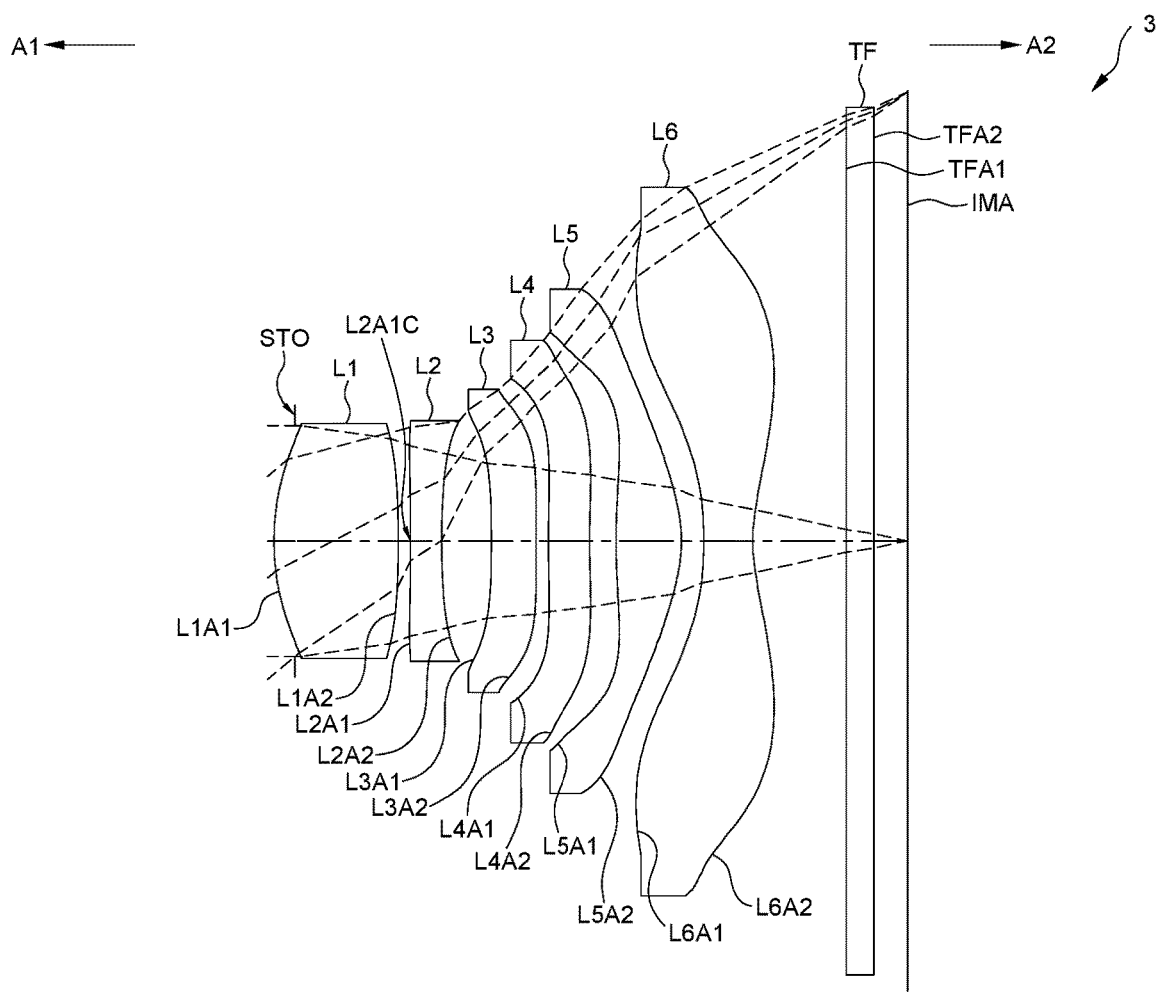
FIG. 14
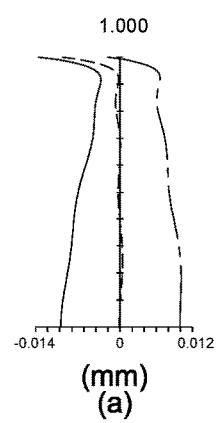
Longitudinal spherical aber. field
1.000
(mm)
(a)
Field curvature (sagittal direction) image height (mm)
3.383
(mm)
(b)
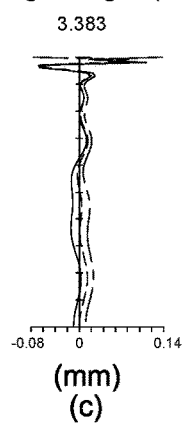
Field curvature (Tangential direction) image height (mm)
3.383
(mm)
(c)
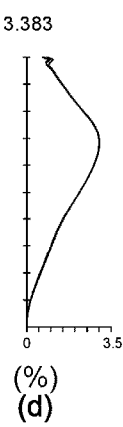
Distortion image height (mm)
3.383
(%)
(d)
—— 470 nm
- - - 555 nm
-·-· 650 nm
FIG. 15

| Embodiment 3 ||||||||
|---|---|---|---|---|---|---|---|
| EFL = 3.939 mm；HFOV = 40.041 dgrees；TTL = 4.770 mm<br>Fno = 2.269；Image Height = 3.383 mm ||||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.160 | | | | |
| L1A1 | 1st lens element | 1.784 | 0.935 | 1.545 | 55.987 | 2.866 | Plastic |
| L1A2 | | -10.392 | 0.093 | | | | |
| L2A1 | 2nd lens element | -19.959 | 0.233 | 1.661 | 20.373 | -6.936 | Plastic |
| L2A2 | | 6.051 | 0.374 | | | | |
| L3A1 | 3rd lens element | -10.537 | 0.335 | 1.545 | 55.987 | -14.253 | Plastic |
| L3A2 | | 30.159 | 0.094 | | | | |
| L4A1 | 4th lens element | 9.517 | 0.312 | 1.640 | 23.529 | -29.777 | Plastic |
| L4A2 | | 6.280 | 0.202 | | | | |
| L5A1 | 5th lens element | 4.917 | 0.489 | 1.545 | 55.987 | 1.791 | Plastic |
| L5A2 | | -1.179 | 0.172 | | | | |
| L6A1 | 6th lens element | -2.489 | 0.367 | 1.545 | 55.987 | -1.592 | Plastic |
| L6A2 | | 1.406 | 0.700 | | | | |
| TFA1 | Filtering unit | INFINITY | 0.210 | 1.517 | 64.167 | | |
| TFA2 | | INFINITY | 0.253 | | | | |
| IMA | Image plane | INFINITY | | | | | |

FIG. 16

| Embodiment 3 ||||
|---|---|---|---|---|
| Aspherical Parameters |||||
| Surface # | K | a2 | a4 | a6 |
| L1A1 | 0.000000E+00 | 0.000000E+00 | -1.859143E-02 | -3.769252E-04 |
| L1A2 | 0.000000E+00 | 0.000000E+00 | -9.404621E-02 | 9.923029E-02 |
| L2A1 | 0.000000E+00 | 0.000000E+00 | -2.480329E-02 | 1.949504E-01 |
| L2A2 | 2.270991E+01 | 0.000000E+00 | 2.391468E-02 | 1.213963E-01 |
| L3A1 | 0.000000E+00 | 0.000000E+00 | -1.164210E-01 | -1.359654E-01 |
| L3A2 | 0.000000E+00 | 0.000000E+00 | -1.557777E-01 | 2.478701E-02 |
| L4A1 | 0.000000E+00 | 0.000000E+00 | -1.870416E-01 | 3.229194E-01 |
| L4A2 | 0.000000E+00 | 0.000000E+00 | -2.390955E-01 | 2.152718E-01 |
| L5A1 | 0.000000E+00 | 0.000000E+00 | -9.948031E-02 | -2.972289E-02 |
| L5A2 | -5.786482E+00 | 0.000000E+00 | 1.423617E-02 | -1.840631E-02 |
| L6A1 | 0.000000E+00 | 0.000000E+00 | -5.877919E-02 | 3.258279E-02 |
| L6A2 | -1.070535E+01 | 0.000000E+00 | -1.080680E-01 | 7.721490E-02 |
| Surface # | a8 | a10 | a12 | a14 |
| L1A1 | -6.125462E-02 | 8.538823E-02 | -6.563765E-02 | -1.192878E-02 |
| L1A2 | -3.442079E-01 | 5.476899E-01 | -3.700120E-01 | 2.738785E-02 |
| L2A1 | -4.342961E-01 | 4.870453E-01 | 2.158558E-02 | -3.933150E-01 |
| L2A2 | -1.810788E-01 | 1.216418E-01 | 6.677924E-02 | -5.757728E-02 |
| L3A1 | 3.036638E-01 | -4.369362E-01 | 3.362740E-01 | -2.421394E-01 |
| L3A2 | -4.025742E-02 | -3.612445E-01 | 6.802864E-01 | -4.780286E-01 |
| L4A1 | -4.739895E-01 | 2.323506E-01 | -4.579482E-02 | 3.639803E-02 |
| L4A2 | -1.269732E-01 | -2.008595E-02 | 4.263988E-02 | -9.751575E-03 |
| L5A1 | 2.623094E-02 | -1.249650E-02 | -5.413948E-03 | 1.478667E-03 |
| L5A2 | 8.094802E-03 | -7.393864E-04 | 2.139432E-04 | -1.438367E-04 |
| L6A1 | 9.054216E-03 | -6.911517E-03 | 1.391663E-03 | -9.413447E-05 |
| L6A2 | -4.390363E-02 | 1.702859E-02 | -4.513335E-03 | 7.894859E-04 |
| Surface # | a16 | a18 | a20 | |
| L1A1 | 2.342870E-02 | | | |
| L1A2 | 4.901445E-02 | | | |
| L2A1 | 1.939402E-01 | | | |
| L2A2 | 3.716088E-03 | | | |
| L3A1 | 1.670173E-01 | | | |
| L3A2 | 1.324141E-01 | | | |
| L4A1 | -1.966131E-02 | | | |
| L4A2 | -4.201791E-05 | | | |
| L5A1 | 1.559849E-03 | -5.481761E-05 | -1.301226E-04 | |
| L5A2 | -6.136453E-05 | 3.811822E-05 | -4.951546E-06 | |
| L6A1 | -9.843726E-07 | -1.410221E-07 | 5.195707E-08 | |
| L6A2 | -8.708979E-05 | 5.597976E-06 | -1.635479E-07 | |

FIG. 17

| Embodiment 4 |||||||
| :---: | :---: | :---: | :---: | :---: | :---: | :---: |
| EFL = 3.935 mm ; HFOV = 40.041 dgrees ; TTL = 4.820 mm |||||||
| Fno = 2.266 ; Image Height = 3.383 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.130 | | | | |
| L1A1 | 1st lens element | 1.829 | 0.959 | 1.545 | 55.987 | 2.846 | Plastic |
| L1A2 | | -8.445 | 0.068 | | | | |
| L2A1 | 2nd lens element | -46.373 | 0.211 | 1.661 | 20.373 | -5.875 | Plastic |
| L2A2 | | 4.289 | 0.268 | | | | |
| L3A1 | 3rd lens element | -30.780 | 0.366 | 1.545 | 55.987 | -14.316 | Plastic |
| L3A2 | | 10.529 | 0.090 | | | | |
| L4A1 | 4th lens element | 7.307 | 0.272 | 1.640 | 23.529 | -55.830 | Plastic |
| L4A2 | | 5.985 | 0.245 | | | | |
| L5A1 | 5th lens element | 4.904 | 0.445 | 1.545 | 55.987 | 1.778 | Plastic |
| L5A2 | | -1.172 | 0.151 | | | | |
| L6A1 | 6th lens element | -2.558 | 0.456 | 1.545 | 55.987 | -1.645 | Plastic |
| L6A2 | | 1.473 | 0.700 | | | | |
| TFA1 | Filtering unit | INFINITY | 0.210 | 1.517 | 64.167 | | |
| TFA2 | | INFINITY | 0.379 | | | | |
| IMA | Image plane | INFINITY | | | | | |

FIG. 20

| Embodiment 4 | | | | |
|---|---|---|---|---|
| Aspherical Parameters | | | | |
| Surface # | K | a2 | a4 | a6 |
| L1A1 | 0.000000E+00 | 0.000000E+00 | -1.950661E-02 | 2.325273E-02 |
| L1A2 | 0.000000E+00 | 0.000000E+00 | -9.830386E-02 | 9.560623E-02 |
| L2A1 | 0.000000E+00 | 0.000000E+00 | -4.461653E-02 | 1.523887E-01 |
| L2A2 | 1.523960E+01 | 0.000000E+00 | -9.893092E-03 | 6.020586E-02 |
| L3A1 | 0.000000E+00 | 0.000000E+00 | -1.177811E-01 | -1.231564E-01 |
| L3A2 | 0.000000E+00 | 0.000000E+00 | -1.261949E-01 | -1.716603E-02 |
| L4A1 | 0.000000E+00 | 0.000000E+00 | -1.752160E-01 | 2.696510E-01 |
| L4A2 | 0.000000E+00 | 0.000000E+00 | -2.468789E-01 | 2.064320E-01 |
| L5A1 | 0.000000E+00 | 0.000000E+00 | -9.623323E-02 | -3.080488E-02 |
| L5A2 | -5.048963E+00 | 0.000000E+00 | 1.353915E-02 | -1.449363E-02 |
| L6A1 | 0.000000E+00 | 0.000000E+00 | -5.806884E-02 | 3.186716E-02 |
| L6A2 | -1.018237E+01 | 0.000000E+00 | -1.098431E-01 | 7.718968E-02 |
| Surface # | a8 | a10 | a12 | a14 |
| L1A1 | -1.281925E-01 | 1.566066E-01 | -2.616748E-02 | -1.475878E-01 |
| L1A2 | -3.826262E-01 | 5.602158E-01 | -1.985902E-01 | -2.086671E-01 |
| L2A1 | -4.462710E-01 | 5.376316E-01 | 4.441526E-02 | -4.488890E-01 |
| L2A2 | -1.130690E-01 | 8.602297E-02 | -5.539848E-02 | 1.022242E-01 |
| L3A1 | 3.254792E-01 | -4.317457E-01 | 3.471356E-01 | -2.277379E-01 |
| L3A2 | -3.313194E-02 | -3.117882E-01 | 6.889835E-01 | -5.021563E-01 |
| L4A1 | -4.617251E-01 | 2.446778E-01 | -3.770320E-02 | 3.852147E-02 |
| L4A2 | -1.307187E-01 | -1.703453E-02 | 4.524937E-02 | -9.216338E-03 |
| L5A1 | 2.761432E-02 | -1.215663E-02 | -5.804840E-03 | 1.297048E-03 |
| L5A2 | 8.381287E-03 | -9.507457E-04 | 1.569942E-03 | -1.616160E-04 |
| L6A1 | 8.946258E-03 | -6.924690E-03 | 1.393281E-03 | -9.362098E-05 |
| L6A2 | -4.387203E-02 | 1.702983E-02 | -4.514724E-03 | 7.891761E-04 |
| Surface # | a16 | a18 | a20 | |
| L1A1 | 9.771223E-02 | | | |
| L1A2 | 1.432386E-01 | | | |
| L2A1 | 2.141276E-01 | | | |
| L2A2 | -6.242776E-02 | | | |
| L3A1 | 1.301199E-01 | | | |
| L3A2 | 1.345455E-01 | | | |
| L4A1 | -2.635943E-02 | | | |
| L4A2 | -7.554965E-04 | | | |
| L5A1 | 1.571693E-03 | -1.176535E-05 | -1.282234E-04 | |
| L5A2 | -6.015727E-05 | 3.936127E-05 | -4.532874E-06 | |
| L6A1 | -8.097714E-07 | -1.202387E-07 | 4.035365E-08 | |
| L6A2 | -8.713648E-05 | 5.597561E-06 | -1.618254E-07 | |

FIG. 21

| Embodiment 5 | | | | | | | |
|---|---|---|---|---|---|---|---|
| EFL = 3.857 mm ; HFOV = 40.041 dgrees ; TTL = 4.773 mm | | | | | | | |
| Fno = 2.222 ; Image Height = 3.383 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.187 | | | | |
| L1A1 | 1st lens element | 1.878 | 1.116 | 1.545 | 55.987 | 2.884 | Plastic |
| L1A2 | | -7.718 | 0.036 | | | | |
| L2A1 | 2nd lens element | 10.219 | 0.210 | 1.661 | 20.373 | -8.324 | Plastic |
| L2A2 | | 3.568 | 0.296 | | | | |
| L3A1 | 3rd lens element | -5.470 | 0.395 | 1.545 | 55.987 | -13.475 | Plastic |
| L3A2 | | -21.833 | 0.046 | | | | |
| L4A1 | 4th lens element | 6.531 | 0.360 | 1.640 | 23.529 | -25.511 | Plastic |
| L4A2 | | 4.573 | 0.224 | | | | |
| L5A1 | 5th lens element | 4.729 | 0.545 | 1.545 | 55.987 | 1.880 | Plastic |
| L5A2 | | -1.258 | 0.213 | | | | |
| L6A1 | 6th lens element | -2.489 | 0.280 | 1.545 | 55.987 | -1.575 | Plastic |
| L6A2 | | 1.367 | 0.700 | | | | |
| TFA1 | Filtering unit | INFINITY | 0.210 | 1.517 | 64.167 | | |
| TFA2 | | INFINITY | 0.143 | | | | |
| IMA | Image plane | INFINITY | | | | | |

FIG. 24

| Embodiment 5 | | | | |
|---|---|---|---|---|
| Aspherical Parameters | | | | |
| Surface # | K | a2 | a4 | a6 |
| L1A1 | 0.000000E+00 | 0.000000E+00 | -1.533438E-02 | 1.798171E-02 |
| L1A2 | 0.000000E+00 | 0.000000E+00 | -8.482106E-02 | 8.124778E-02 |
| L2A1 | 0.000000E+00 | 0.000000E+00 | -5.272203E-02 | 1.374411E-01 |
| L2A2 | 1.113713E+01 | 0.000000E+00 | -2.588630E-02 | 4.634421E-02 |
| L3A1 | 0.000000E+00 | 0.000000E+00 | -5.820762E-02 | -9.653077E-02 |
| L3A2 | 0.000000E+00 | 0.000000E+00 | -8.514855E-02 | 2.186039E-03 |
| L4A1 | 0.000000E+00 | 0.000000E+00 | -1.709995E-01 | 2.788428E-01 |
| L4A2 | 0.000000E+00 | 0.000000E+00 | -2.381176E-01 | 2.146692E-01 |
| L5A1 | 0.000000E+00 | 0.000000E+00 | -9.827740E-02 | -2.943538E-02 |
| L5A2 | -7.538058E+00 | 0.000000E+00 | 1.337004E-02 | -1.596148E-02 |
| L6A1 | 0.000000E+00 | 0.000000E+00 | -5.659051E-02 | 3.231883E-02 |
| L6A2 | -1.204214E+01 | 0.000000E+00 | -1.092110E-01 | 7.769504E-02 |
| Surface # | a8 | a10 | a12 | a14 |
| L1A1 | -1.106801E-01 | 1.467256E-01 | -1.993890E-02 | -1.591300E-01 |
| L1A2 | -3.889625E-01 | 5.852590E-01 | -2.110918E-01 | -2.081849E-01 |
| L2A1 | -4.676207E-01 | 5.521891E-01 | 5.186360E-02 | -4.841151E-01 |
| L2A2 | -1.203322E-01 | 4.377746E-02 | -2.298633E-02 | 1.321879E-01 |
| L3A1 | 2.509594E-01 | -3.883010E-01 | 3.789436E-01 | -2.336715E-01 |
| L3A2 | -5.047263E-02 | -3.252995E-01 | 7.099526E-01 | -4.912729E-01 |
| L4A1 | -4.697868E-01 | 2.471478E-01 | -3.855791E-02 | 3.404718E-02 |
| L4A2 | -1.299682E-01 | -1.986244E-02 | 4.381390E-02 | -9.494761E-03 |
| L5A1 | 2.668343E-02 | -1.226090E-02 | -5.452909E-03 | 1.448787E-03 |
| L5A2 | 8.218139E-03 | -8.236519E-04 | 1.938738E-04 | -1.475182E-04 |
| L6A1 | 9.007794E-03 | -6.912195E-03 | 1.392190E-03 | -9.399294E-05 |
| L6A2 | -4.387279E-02 | 1.702968E-02 | -4.513695E-03 | 7.894214E-04 |
| Surface # | a16 | a18 | a20 | |
| L1A1 | 1.091601E-01 | | | |
| L1A2 | 1.397995E-01 | | | |
| L2A1 | 2.402413E-01 | | | |
| L2A2 | -1.005890E-01 | | | |
| L3A1 | 1.044624E-01 | | | |
| L3A2 | 1.227334E-01 | | | |
| L4A1 | -2.338293E-02 | | | |
| L4A2 | -3.033351E-04 | | | |
| L5A1 | 1.562302E-03 | -3.745756E-05 | -1.366897E-04 | |
| L5A2 | -6.244339E-05 | 3.865362E-05 | -4.711529E-06 | |
| L6A1 | -9.685878E-07 | -1.418169E-07 | 5.147337E-08 | |
| L6A2 | -8.709307E-05 | 5.597320E-06 | -1.634592E-07 | |

FIG. 25

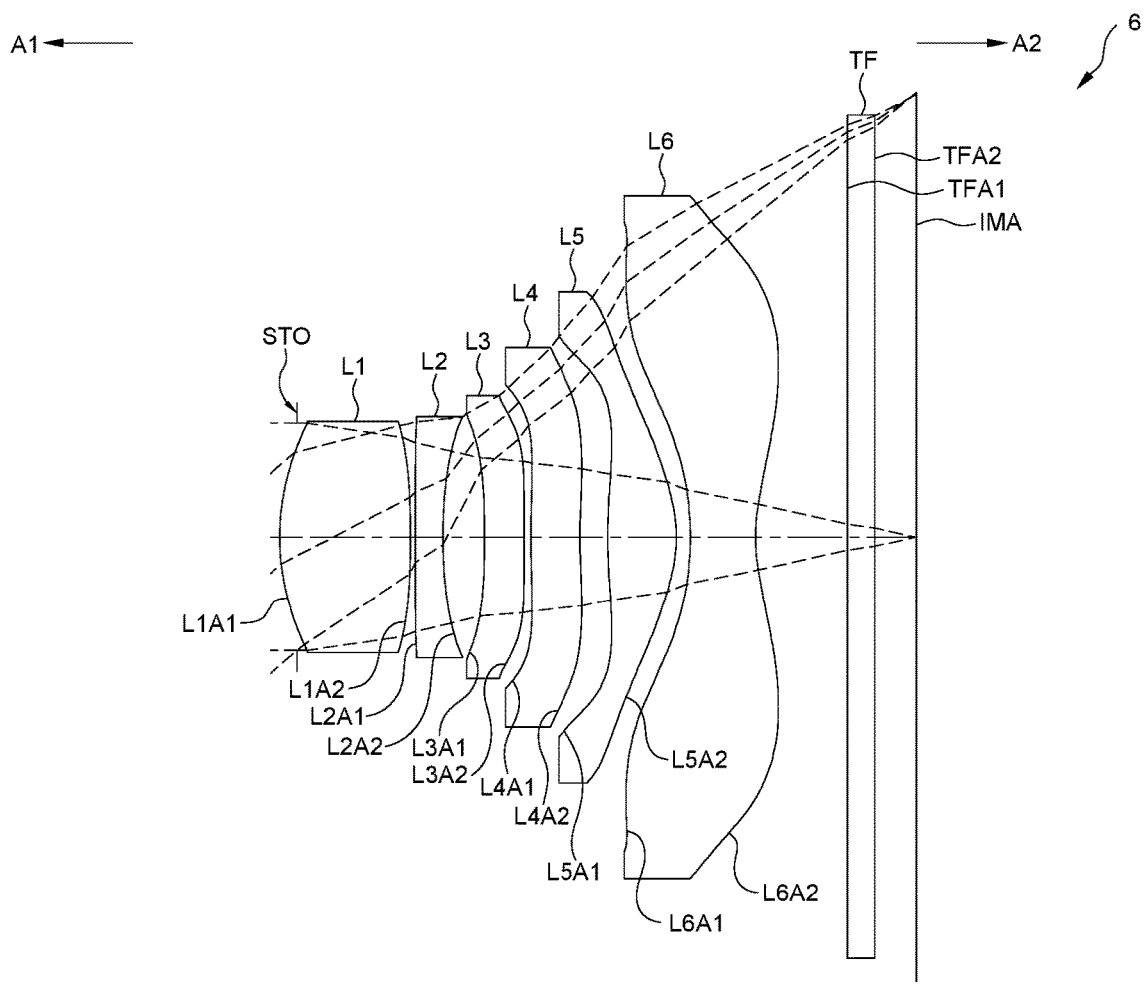
FIG. 26
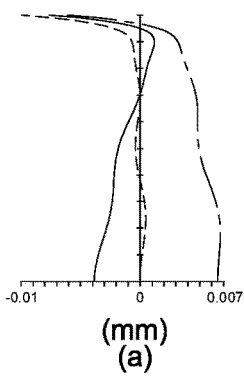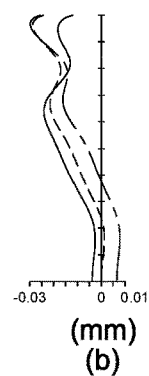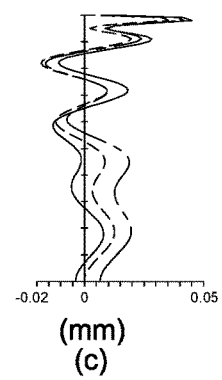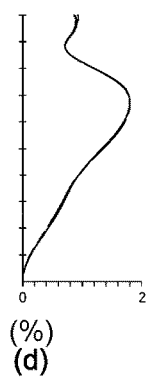
FIG. 27

| Embodiment 6 |||||||
|---|---|---|---|---|---|---|
| EFL = 3.937 mm ; HFOV = 40.041 dgrees ; TTL = 4.856 mm |||||||
| Fno = 2.267 ; Image Height = 3.383 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.132 | | | | |
| L1A1 | 1st lens element | 1.799 | 0.996 | 1.545 | 55.987 | 2.760 | Plastic |
| L1A2 | | -7.487 | 0.036 | | | | |
| L2A1 | 2nd lens element | 58.262 | 0.210 | 1.661 | 20.373 | -6.022 | Plastic |
| L2A2 | | 3.753 | 0.317 | | | | |
| L3A1 | 3rd lens element | -8.219 | 0.299 | 1.545 | 55.987 | -12.700 | Plastic |
| L3A2 | | 45.059 | 0.053 | | | | |
| L4A1 | 4th lens element | 7.780 | 0.378 | 1.642 | 22.409 | -30.695 | Plastic |
| L4A2 | | 5.484 | 0.212 | | | | |
| L5A1 | 5th lens element | 4.407 | 0.521 | 1.531 | 55.745 | 1.727 | Plastic |
| L5A2 | | -1.117 | 0.105 | | | | |
| L6A1 | 6th lens element | -2.481 | 0.497 | 1.531 | 55.745 | -1.589 | Plastic |
| L6A2 | | 1.377 | 0.700 | | | | |
| TFA1 | Filtering unit | INFINITY | 0.210 | 1.517 | 64.167 | | |
| TFA2 | | INFINITY | 0.321 | | | | |
| IMA | Image plane | INFINITY | | | | | |

FIG. 28

| Embodiment 6 ||||
|---|---|---|---|---|
| Aspherical Parameters |||||
| Surface # | K | a2 | a4 | a6 |
| L1A1 | 0.000000E+00 | 0.000000E+00 | -1.481072E-02 | -5.740266E-04 |
| L1A2 | 0.000000E+00 | 0.000000E+00 | -8.142884E-02 | 1.279399E-01 |
| L2A1 | 0.000000E+00 | 0.000000E+00 | -3.768576E-02 | 1.824957E-01 |
| L2A2 | 8.826702E+00 | 0.000000E+00 | -7.969930E-03 | 7.817545E-02 |
| L3A1 | 0.000000E+00 | 0.000000E+00 | -7.997754E-02 | -1.633284E-01 |
| L3A2 | 0.000000E+00 | 0.000000E+00 | -1.217895E-01 | -3.200426E-03 |
| L4A1 | 0.000000E+00 | 0.000000E+00 | -1.798894E-01 | 3.097863E-01 |
| L4A2 | 0.000000E+00 | 0.000000E+00 | -2.343635E-01 | 2.205382E-01 |
| L5A1 | 0.000000E+00 | 0.000000E+00 | -1.078875E-01 | -1.671226E-02 |
| L5A2 | -5.113232E+00 | 0.000000E+00 | 8.808700E-03 | -1.419591E-02 |
| L6A1 | 0.000000E+00 | 0.000000E+00 | -5.407916E-02 | 3.212836E-02 |
| L6A2 | -9.655450E+00 | 0.000000E+00 | -1.073568E-01 | 7.723148E-02 |
| Surface # | a8 | a10 | a12 | a14 |
| L1A1 | -5.343059E-02 | 1.018275E-01 | -1.300670E-01 | 6.829374E-02 |
| L1A2 | -4.168441E-01 | 5.816735E-01 | -3.165902E-01 | -2.849651E-02 |
| L2A1 | -4.505313E-01 | 5.184940E-01 | -1.065106E-01 | -1.858230E-01 |
| L2A2 | -1.325223E-01 | 1.062762E-01 | -4.269835E-02 | 4.730524E-02 |
| L3A1 | 3.196711E-01 | -3.706697E-01 | 3.230120E-01 | -3.442869E-01 |
| L3A2 | -4.388702E-02 | -3.412845E-01 | 6.925433E-01 | -4.960591E-01 |
| L4A1 | -4.883076E-01 | 2.375748E-01 | -3.394281E-02 | 4.052827E-02 |
| L4A2 | -1.258367E-01 | -2.058444E-02 | 4.254490E-02 | -1.002040E-02 |
| L5A1 | 2.581933E-02 | -1.314438E-02 | -5.785923E-03 | 1.407796E-03 |
| L5A2 | 8.291739E-03 | -8.146835E-04 | 1.819544E-04 | -1.482410E-04 |
| L6A1 | 8.961309E-03 | -6.913942E-03 | 1.392517E-03 | -9.385367E-05 |
| L6A2 | -4.388560E-02 | 1.702881E-02 | -4.514258E-03 | 7.892653E-04 |
| Surface # | a16 | a18 | a20 | |
| L1A1 | -1.089699E-02 | | | |
| L1A2 | 5.986256E-02 | | | |
| L2A1 | 9.018837E-02 | | | |
| L2A2 | -2.252441E-02 | | | |
| L3A1 | 2.372066E-01 | | | |
| L3A2 | 1.467024E-01 | | | |
| L4A1 | -2.634742E-02 | | | |
| L4A2 | 2.323540E-05 | | | |
| L5A1 | 1.582504E-03 | -1.844853E-05 | -1.374547E-04 | |
| L5A2 | -6.254246E-05 | 3.854213E-05 | -4.754673E-06 | |
| L6A1 | -9.531246E-07 | -1.426221E-07 | 5.014211E-08 | |
| L6A2 | -8.711002E-05 | 5.597453E-06 | -1.627365E-07 | |

FIG. 29

| Embodiment 7 ||||||||
| EFL = 4.085 mm ; HFOV = 40.041 dgrees ; TTL = 4.698 mm ||||||||
| Fno = 2.269 ; Image Height = 3.383 mm ||||||||
| Surface # | | Radius (mm) | Thickness /air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | -0.170 | | | | |
| L1A1 | 1st lens element | 1.666 | 0.951 | 1.545 | 55.987 | 2.718 | Plastic |
| L1A2 | | -10.878 | 0.044 | | | | |
| L2A1 | 2nd lens element | 444.231 | 0.210 | 1.661 | 20.373 | -5.706 | Plastic |
| L2A2 | | 3.773 | 0.272 | | | | |
| L3A1 | 3rd lens element | 312.441 | 0.218 | 1.545 | 55.987 | -15.308 | Plastic |
| L3A2 | | 8.142 | 0.101 | | | | |
| L4A1 | 4th lens element | 4.737 | 0.318 | 1.640 | 23.529 | -121.503 | Plastic |
| L4A2 | | 4.349 | 0.271 | | | | |
| L5A1 | 5th lens element | 7.454 | 0.577 | 1.545 | 55.987 | 1.798 | Plastic |
| L5A2 | | -1.100 | 0.136 | | | | |
| L6A1 | 6th lens element | -2.475 | 0.415 | 1.545 | 55.987 | -1.418 | Plastic |
| L6A2 | | 1.195 | 0.700 | | | | |
| TFA1 | Filtering unit | INFINITY | 0.210 | 1.517 | 64.167 | | |
| TFA2 | | INFINITY | 0.274 | | | | |
| IMA | Image plane | INFINITY | | | | | |

FIG. 32

| Embodiment 7 | | | | |
|---|---|---|---|---|
| Aspherical Parameters | | | | |
| Surface # | K | a2 | a4 | a6 |
| L1A1 | 0.000000E+00 | 0.000000E+00 | -1.731266E-02 | 2.436853E-02 |
| L1A2 | 0.000000E+00 | 0.000000E+00 | -1.059665E-01 | 8.314335E-02 |
| L2A1 | 0.000000E+00 | 0.000000E+00 | -4.711865E-02 | 1.469905E-01 |
| L2A2 | 1.400535E+01 | 0.000000E+00 | -3.503322E-03 | 7.734886E-02 |
| L3A1 | 0.000000E+00 | 0.000000E+00 | -9.358579E-02 | -1.058954E-01 |
| L3A2 | 0.000000E+00 | 0.000000E+00 | -9.085697E-02 | 8.425583E-03 |
| L4A1 | 0.000000E+00 | 0.000000E+00 | -1.617626E-01 | 2.921837E-01 |
| L4A2 | 0.000000E+00 | 0.000000E+00 | -2.312081E-01 | 2.159985E-01 |
| L5A1 | 0.000000E+00 | 0.000000E+00 | -9.422646E-02 | -3.309123E-02 |
| L5A2 | -6.004529E+00 | 0.000000E+00 | 2.642899E-03 | -1.546814E-02 |
| L6A1 | 0.000000E+00 | 0.000000E+00 | -5.606098E-02 | 3.220478E-02 |
| L6A2 | -1.200966E+01 | 0.000000E+00 | -1.151842E-01 | 7.764922E-02 |
| Surface # | a8 | a10 | a12 | a14 |
| L1A1 | -1.312539E-01 | 1.501906E-01 | -8.005236E-03 | -1.666521E-01 |
| L1A2 | -3.786603E-01 | 5.744668E-01 | -2.103758E-01 | -2.108007E-01 |
| L2A1 | -4.393637E-01 | 5.707607E-01 | 1.533854E-02 | -4.887695E-01 |
| L2A2 | -1.034413E-01 | 2.988541E-02 | -1.697990E-02 | 1.653835E-01 |
| L3A1 | 2.559568E-01 | -3.533644E-01 | 4.361751E-01 | -2.554511E-01 |
| L3A2 | -3.480922E-02 | -3.129583E-01 | 7.056024E-01 | -4.957680E-01 |
| L4A1 | -4.547973E-01 | 2.387027E-01 | -5.079302E-02 | 3.031453E-02 |
| L4A2 | -1.313249E-01 | -1.962346E-02 | 4.404831E-02 | -9.447226E-03 |
| L5A1 | 2.836588E-02 | -1.133102E-02 | -5.353131E-03 | 1.425448E-03 |
| L5A2 | 8.530886E-03 | -7.981691E-04 | 1.894794E-04 | -1.517908E-04 |
| L6A1 | 8.988302E-03 | -6.913370E-03 | 1.392306E-03 | -9.395515E-05 |
| L6A2 | -4.386446E-02 | 1.703087E-02 | -4.513593E-03 | 7.894394E-04 |
| Surface # | a16 | a18 | a20 | |
| L1A1 | 9.906699E-02 | | | |
| L1A2 | 1.464608E-01 | | | |
| L2A1 | 2.642739E-01 | | | |
| L2A2 | -1.472586E-01 | | | |
| L3A1 | 2.242975E-02 | | | |
| L3A2 | 1.164679E-01 | | | |
| L4A1 | -1.817322E-02 | | | |
| L4A2 | -3.709699E-04 | | | |
| L5A1 | 1.549666E-03 | -3.819074E-05 | -1.356794E-04 | |
| L5A2 | -6.394313E-05 | 3.830228E-05 | -4.702197E-06 | |
| L6A1 | -9.559680E-07 | -1.410994E-07 | 5.150365E-08 | |
| L6A2 | -8.709180E-05 | 5.597270E-06 | -1.635558E-07 | |

FIG. 33

| Embodiment 8 |||||||
|---|---|---|---|---|---|---|---|
| EFL = 3.878 mm ; HFOV = 38.994 dgrees ; TTL = 4.728 mm<br>Fno = 2.234 ; Image Height = 3.262 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.198 | | | | |
| L1A1 | 1st lens element | 1.745 | 1.101 | 1.545 | 55.987 | 2.749 | Plastic |
| L1A2 | | -8.384 | 0.036 | | | | |
| L2A1 | 2nd lens element | 5621.158 | 0.210 | 1.661 | 20.373 | -5.693 | Plastic |
| L2A2 | | 3.795 | 0.246 | | | | |
| L3A1 | 3rd lens element | 229.710 | 0.295 | 1.545 | 55.987 | -13.510 | Plastic |
| L3A2 | | 7.147 | 0.071 | | | | |
| L4A1 | 4th lens element | 5.181 | 0.354 | 1.640 | 23.529 | -61.007 | Plastic |
| L4A2 | | 4.455 | 0.228 | | | | |
| L5A1 | 5th lens element | 5.809 | 0.560 | 1.545 | 55.987 | 1.847 | Plastic |
| L5A2 | | -1.179 | 0.200 | | | | |
| L6A1 | 6th lens element | -2.491 | 0.347 | 1.545 | 55.987 | -1.590 | Plastic |
| L6A2 | | 1.399 | 0.700 | | | | |
| TFA1 | Filtering unit | INFINITY | 0.210 | 1.517 | 64.167 | | |
| TFA2 | | INFINITY | 0.169 | | | | |
| IMA | Image plane | INFINITY | | | | | |

FIG. 36

| Embodiment 8 ||||
|---|---|---|---|---|
| Aspherical Parameters |||||
| Surface # | K | a2 | a4 | a6 |
| L1A1 | 0.000000E+00 | 0.000000E+00 | -1.741080E-02 | 3.072684E-02 |
| L1A2 | 0.000000E+00 | 0.000000E+00 | -1.053485E-01 | 9.501578E-02 |
| L2A1 | 0.000000E+00 | 0.000000E+00 | -5.154901E-02 | 1.366203E-01 |
| L2A2 | 1.381023E+01 | 0.000000E+00 | -1.020901E-02 | 6.053058E-02 |
| L3A1 | 0.000000E+00 | 0.000000E+00 | -9.248038E-02 | -8.130609E-02 |
| L3A2 | 0.000000E+00 | 0.000000E+00 | -7.827237E-02 | 3.103260E-03 |
| L4A1 | 0.000000E+00 | 0.000000E+00 | -1.444963E-01 | 2.862982E-01 |
| L4A2 | 0.000000E+00 | 0.000000E+00 | -2.348568E-01 | 2.188974E-01 |
| L5A1 | 0.000000E+00 | 0.000000E+00 | -8.455087E-02 | -3.598589E-02 |
| L5A2 | -6.302200E+00 | 0.000000E+00 | 1.145465E-02 | -1.447631E-02 |
| L6A1 | 0.000000E+00 | 0.000000E+00 | -5.585750E-02 | 3.232785E-02 |
| L6A2 | -1.216310E+01 | 0.000000E+00 | -1.119169E-01 | 7.781503E-02 |
| Surface # | a8 | a10 | a12 | a14 |
| L1A1 | -1.322418E-01 | 1.606194E-01 | -2.967260E-03 | -1.808211E-01 |
| L1A2 | -3.572684E-01 | 5.772169E-01 | -2.240024E-01 | -2.431705E-01 |
| L2A1 | -4.459449E-01 | 5.940561E-01 | 9.126098E-03 | -5.205074E-01 |
| L2A2 | -1.095650E-01 | 1.963644E-02 | -1.207427E-02 | 1.855885E-01 |
| L3A1 | 2.631318E-01 | -3.716319E-01 | 3.976848E-01 | -2.855164E-01 |
| L3A2 | -4.511159E-02 | -3.208366E-01 | 7.044053E-01 | -4.943530E-01 |
| L4A1 | -4.702891E-01 | 2.456368E-01 | -4.096050E-02 | 3.294590E-02 |
| L4A2 | -1.305748E-01 | -1.987223E-02 | 4.386347E-02 | -9.488019E-03 |
| L5A1 | 2.718138E-02 | -1.134721E-02 | -5.253685E-03 | 1.474130E-03 |
| L5A2 | 8.299926E-03 | -8.569661E-04 | 1.798623E-04 | -1.509098E-04 |
| L6A1 | 9.005590E-03 | -6.912259E-03 | 1.392177E-03 | -9.401327E-05 |
| L6A2 | -4.385363E-02 | 1.703194E-02 | -4.513503E-03 | 7.894412E-04 |
| Surface # | a16 | a18 | a20 | |
| L1A1 | 1.119654E-01 | | | |
| L1A2 | 1.758477E-01 | | | |
| L2A1 | 2.803391E-01 | | | |
| L2A2 | -1.684237E-01 | | | |
| L3A1 | 8.575842E-02 | | | |
| L3A2 | 1.199806E-01 | | | |
| L4A1 | -2.179804E-02 | | | |
| L4A2 | -3.449296E-04 | | | |
| L5A1 | 1.560453E-03 | -4.152592E-05 | -1.406668E-04 | |
| L5A2 | -6.323819E-05 | 3.862937E-05 | -4.646728E-06 | |
| L6A1 | -9.670171E-07 | -1.418696E-07 | 5.158943E-08 | |
| L6A2 | -8.709336E-05 | 5.597151E-06 | -1.635486E-07 | |

FIG. 37

| Embodiment 9 | | | | | | | |
|---|---|---|---|---|---|---|---|
| EFL = 3.781 mm ; HFOV = 40.051 dgrees ; TTL = 4.664 mm | | | | | | | |
| Fno = 2.218 ; Image Height = 3.323 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.170 | | | | |
| L1A1 | 1st lens element | 1.916 | 0.956 | 1.545 | 55.987 | 3.507 | Plastic |
| L1A2 | | -1256224360.503 | 0.053 | | | | |
| L2A1 | 2nd lens element | 4.300 | 0.210 | 1.661 | 20.373 | 847.874 | Plastic |
| L2A2 | | 4.248 | 0.347 | | | | |
| L3A1 | 3rd lens element | -3.358 | 0.379 | 1.545 | 55.987 | -17.310 | Plastic |
| L3A2 | | -5.414 | 0.051 | | | | |
| L4A1 | 4th lens element | 6.439 | 0.252 | 1.640 | 23.529 | -10.588 | Plastic |
| L4A2 | | 3.262 | 0.208 | | | | |
| L5A1 | 5th lens element | 5.370 | 0.655 | 1.545 | 55.987 | 1.825 | Plastic |
| L5A2 | | -1.172 | 0.180 | | | | |
| L6A1 | 6th lens element | -2.445 | 0.314 | 1.545 | 55.987 | -1.556 | Plastic |
| L6A2 | | 1.362 | 0.700 | | | | |
| TFA1 | Filtering unit | INFINITY | 0.210 | 1.517 | 64.167 | | |
| TFA2 | | INFINITY | 0.149 | | | | |
| IMA | Image plane | INFINITY | | | | | |

FIG. 40

| Embodiment 9 ||||
|---|---|---|---|---|
| Aspherical Parameters |||||
| Surface # | K | a2 | a4 | a6 |
| L1A1 | 0.000000E+00 | 0.000000E+00 | -2.150676E-02 | 1.377503E-02 |
| L1A2 | 0.000000E+00 | 0.000000E+00 | -1.282253E-01 | 9.467571E-02 |
| L2A1 | 0.000000E+00 | 0.000000E+00 | -5.136642E-02 | 1.471046E-01 |
| L2A2 | 1.879084E+01 | 0.000000E+00 | -1.808644E-03 | 3.232261E-02 |
| L3A1 | 0.000000E+00 | 0.000000E+00 | -7.391829E-02 | -8.959150E-02 |
| L3A2 | 0.000000E+00 | 0.000000E+00 | -9.333587E-02 | -3.989153E-02 |
| L4A1 | 0.000000E+00 | 0.000000E+00 | -2.071759E-01 | 2.424672E-01 |
| L4A2 | 0.000000E+00 | 0.000000E+00 | -2.643812E-01 | 2.300796E-01 |
| L5A1 | 0.000000E+00 | 0.000000E+00 | -9.830373E-02 | -2.239210E-02 |
| L5A2 | -5.892587E+00 | 0.000000E+00 | 1.018507E-02 | -4.412748E-03 |
| L6A1 | 0.000000E+00 | 0.000000E+00 | -5.973633E-02 | 3.438874E-02 |
| L6A2 | -1.046597E+01 | 0.000000E+00 | -1.185887E-01 | 8.571605E-02 |
| Surface # | a8 | a10 | a12 | a14 |
| L1A1 | -1.252769E-01 | 1.681137E-01 | -3.381104E-02 | -1.646985E-01 |
| L1A2 | -4.375849E-01 | 6.842638E-01 | -2.455717E-01 | -3.142948E-01 |
| L2A1 | -4.513002E-01 | 4.394040E-01 | 3.395694E-01 | -8.426607E-01 |
| L2A2 | -1.752430E-01 | 1.083680E-01 | 1.349704E-02 | -5.704096E-02 |
| L3A1 | 1.234552E-02 | -1.656367E-01 | 9.263190E-01 | -1.395035E+00 |
| L3A2 | -1.006852E-01 | -2.443627E-01 | 9.303945E-01 | -9.391115E-01 |
| L4A1 | -4.323817E-01 | 2.505079E-01 | -4.852472E-02 | 1.625057E-02 |
| L4A2 | -1.448895E-01 | -1.324480E-02 | 5.305874E-02 | -1.658655E-02 |
| L5A1 | 2.519774E-02 | -1.539058E-02 | -1.434116E-03 | 1.246236E-03 |
| L5A2 | 2.374047E-03 | -2.308856E-04 | 4.871723E-04 | -2.108994E-04 |
| L6A1 | 1.056246E-02 | -8.141214E-03 | 1.692305E-03 | -1.197613E-04 |
| L6A2 | -4.963916E-02 | 1.997217E-02 | -5.509502E-03 | 1.002016E-03 |
| Surface # | a16 | a18 | a20 | |
| L1A1 | 1.167787E-01 | | | |
| L1A2 | 2.311199E-01 | | | |
| L2A1 | 4.085834E-01 | | | |
| L2A2 | 1.431880E-02 | | | |
| L3A1 | 7.927390E-01 | | | |
| L3A2 | 3.546126E-01 | | | |
| L4A1 | -2.030314E-02 | | | |
| L4A2 | 9.210752E-04 | | | |
| L5A1 | 1.156108E-03 | 7.756220E-05 | -1.673511E-04 | |
| L5A2 | -9.003914E-05 | 5.222205E-05 | -6.365592E-06 | |
| L6A1 | -1.116322E-06 | -1.456232E-07 | 6.511874E-08 | |
| L6A2 | -1.144774E-04 | 7.560367E-06 | -2.249783E-07 | |

FIG. 41

| Embodiment 10 ||||||||
|---|---|---|---|---|---|---|---|
| EFL = 3.781 mm；HFOV = 38.994 dgrees；TTL = 4.609 mm ||||||||
| Fno = 2.218；Image Height = 3.202 mm ||||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.157 | | | | |
| L1A1 | 1st lens element | 1.721 | 0.930 | 1.545 | 55.987 | 2.770 | Plastic |
| L1A2 | | -10.128 | 0.037 | | | | |
| L2A1 | 2nd lens element | 38.491 | 0.241 | 1.661 | 20.373 | -5.651 | Plastic |
| L2A2 | | 3.425 | 0.298 | | | | |
| L3A1 | 3rd lens element | -17.156 | 0.310 | 1.545 | 55.987 | 774.446 | Plastic |
| L3A2 | | -16.593 | 0.062 | | | | |
| L4A1 | 4th lens element | 6.759 | 0.292 | 1.640 | 23.529 | -22.245 | Plastic |
| L4A2 | | 4.516 | 0.278 | | | | |
| L5A1 | 5th lens element | 6.913 | 0.568 | 1.545 | 55.987 | 1.850 | Plastic |
| L5A2 | | -1.149 | 0.181 | | | | |
| L6A1 | 6th lens element | -2.453 | 0.353 | 1.545 | 55.987 | -1.497 | Plastic |
| L6A2 | | 1.289 | 0.700 | | | | |
| TFA1 | Filtering unit | INFINITY | 0.210 | 1.517 | 64.167 | | |
| TFA2 | | INFINITY | 0.152 | | | | |
| IMA | Image plane | INFINITY | | | | | |

FIG. 44

| Embodiment 10 | | | | |
|---|---|---|---|---|
| Aspherical Parameters | | | | |
| Surface # | K | a2 | a4 | a6 |
| L1A1 | 0.000000E+00 | 0.000000E+00 | -1.372577E-02 | 2.255754E-02 |
| L1A2 | 0.000000E+00 | 0.000000E+00 | -6.840104E-02 | 1.000990E-01 |
| L2A1 | 0.000000E+00 | 0.000000E+00 | -5.318039E-02 | 1.465918E-01 |
| L2A2 | 1.124172E+01 | 0.000000E+00 | -4.848458E-02 | 7.104490E-02 |
| L3A1 | 0.000000E+00 | 0.000000E+00 | -8.416210E-02 | -6.582182E-02 |
| L3A2 | 0.000000E+00 | 0.000000E+00 | -6.540057E-02 | -5.619056E-02 |
| L4A1 | 0.000000E+00 | 0.000000E+00 | -1.817959E-01 | 2.517002E-01 |
| L4A2 | 0.000000E+00 | 0.000000E+00 | -2.664656E-01 | 2.305164E-01 |
| L5A1 | 0.000000E+00 | 0.000000E+00 | -9.632734E-02 | -2.861954E-02 |
| L5A2 | -5.994936E+00 | 0.000000E+00 | 9.264465E-03 | -3.355557E-03 |
| L6A1 | 0.000000E+00 | 0.000000E+00 | -5.897599E-02 | 3.441998E-02 |
| L6A2 | -1.102828E+01 | 0.000000E+00 | -1.199048E-01 | 8.573974E-02 |
| Surface # | a8 | a10 | a12 | a14 |
| L1A1 | -1.257920E-01 | 1.754146E-01 | -3.998517E-02 | -1.748726E-01 |
| L1A2 | -4.656228E-01 | 6.773018E-01 | -1.860943E-01 | -3.504109E-01 |
| L2A1 | -4.461997E-01 | 4.646371E-01 | 3.334874E-01 | -8.303219E-01 |
| L2A2 | -1.504644E-01 | 8.538294E-02 | 9.446971E-03 | 1.215338E-02 |
| L3A1 | 8.061616E-03 | -1.677807E-01 | 8.708542E-01 | -1.441631E+00 |
| L3A2 | -1.085612E-01 | -2.453989E-01 | 9.324628E-01 | -9.410741E-01 |
| L4A1 | -4.282164E-01 | 2.543698E-01 | -4.625896E-02 | 1.743918E-02 |
| L4A2 | -1.451434E-01 | -1.342626E-02 | 5.294366E-02 | -1.661945E-02 |
| L5A1 | 2.182126E-02 | -1.637184E-02 | -1.613721E-03 | 1.311602E-03 |
| L5A2 | 2.486953E-03 | -2.342127E-04 | 4.807056E-04 | -2.131067E-04 |
| L6A1 | 1.055896E-02 | -8.141921E-03 | 1.692232E-03 | -1.197566E-04 |
| L6A2 | -4.963163E-02 | 1.997402E-02 | -5.509263E-03 | 1.002046E-03 |
| Surface # | a16 | a18 | a20 | |
| L1A1 | 1.250802E-01 | | | |
| L1A2 | 2.298946E-01 | | | |
| L2A1 | 3.949581E-01 | | | |
| L2A2 | -2.865424E-02 | | | |
| L3A1 | 8.251957E-01 | | | |
| L3A2 | 3.393849E-01 | | | |
| L4A1 | -1.743776E-02 | | | |
| L4A2 | 1.006006E-03 | | | |
| L5A1 | 1.217453E-03 | 1.039789E-04 | -1.640539E-04 | |
| L5A2 | -9.026114E-05 | 5.225966E-05 | -6.316657E-06 | |
| L6A1 | -1.113253E-06 | -1.446462E-07 | 6.559471E-08 | |
| L6A2 | -1.144736E-04 | 7.560841E-06 | -2.249207E-07 | |

FIG. 45

| Embodiment 11 |||||||
|---|---|---|---|---|---|---|
| EFL = 3.852 mm ; HFOV = 38.994 dgrees ; TTL = 4.650 mm |||||||
| Fno = 2.219 ; Image Height = 3.262 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.208 | | | | |
| L1A1 | 1st lens element | 1.694 | 1.048 | 1.545 | 55.987 | 2.709 | Plastic |
| L1A2 | | -9.137 | 0.036 | | | | |
| L2A1 | 2nd lens element | 265.702 | 0.210 | 1.661 | 20.373 | -5.721 | Plastic |
| L2A2 | | 3.761 | 0.293 | | | | |
| L3A1 | 3rd lens element | -20.453 | 0.234 | 1.545 | 55.987 | -11.570 | Plastic |
| L3A2 | | 9.184 | 0.045 | | | | |
| L4A1 | 4th lens element | 4.786 | 0.334 | 1.640 | 23.529 | 1117.483 | Plastic |
| L4A2 | | 4.686 | 0.240 | | | | |
| L5A1 | 5th lens element | 6.332 | 0.575 | 1.545 | 55.987 | 1.847 | Plastic |
| L5A2 | | -1.162 | 0.177 | | | | |
| L6A1 | 6th lens element | -2.490 | 0.364 | 1.545 | 55.987 | -1.579 | Plastic |
| L6A2 | | 1.387 | 0.700 | | | | |
| TFA1 | Filtering unit | INFINITY | 0.210 | 1.517 | 64.167 | | |
| TFA2 | | INFINITY | 0.184 | | | | |
| IMA | Image plane | INFINITY | | | | | |

FIG. 48

| Embodiment 11 ||||
|---|---|---|---|---|
| Aspherical Parameters |||||
| Surface # | K | a2 | a4 | a6 |
| L1A1 | 0.000000E+00 | 0.000000E+00 | -1.670745E-02 | 2.906923E-02 |
| L1A2 | 0.000000E+00 | 0.000000E+00 | -1.052951E-01 | 9.438515E-02 |
| L2A1 | 0.000000E+00 | 0.000000E+00 | -4.978663E-02 | 1.426707E-01 |
| L2A2 | 1.373999E+01 | 0.000000E+00 | -6.251378E-03 | 6.758483E-02 |
| L3A1 | 0.000000E+00 | 0.000000E+00 | -9.860605E-02 | -8.756896E-02 |
| L3A2 | 0.000000E+00 | 0.000000E+00 | -8.428711E-02 | -1.060852E-03 |
| L4A1 | 0.000000E+00 | 0.000000E+00 | -1.560139E-01 | 2.878159E-01 |
| L4A2 | 0.000000E+00 | 0.000000E+00 | -2.340593E-01 | 2.184676E-01 |
| L5A1 | 0.000000E+00 | 0.000000E+00 | -8.486499E-02 | -3.606341E-02 |
| L5A2 | -6.049899E+00 | 0.000000E+00 | 9.161547E-03 | -1.424098E-02 |
| L6A1 | 0.000000E+00 | 0.000000E+00 | -5.585001E-02 | 3.232651E-02 |
| L6A2 | -1.207415E+01 | 0.000000E+00 | -1.118889E-01 | 7.778814E-02 |
| Surface # | a8 | a10 | a12 | a14 |
| L1A1 | -1.343745E-01 | 1.627152E-01 | -5.734544E-03 | -1.818806E-01 |
| L1A2 | -3.620380E-01 | 5.759660E-01 | -2.282978E-01 | -2.410217E-01 |
| L2A1 | -4.413733E-01 | 5.918850E-01 | 3.717223E-03 | -5.308368E-01 |
| L2A2 | -1.108166E-01 | 2.134166E-02 | -7.651811E-03 | 1.833471E-01 |
| L3A1 | 2.610177E-01 | -3.759038E-01 | 3.887911E-01 | -2.869599E-01 |
| L3A2 | -4.714775E-02 | -3.223499E-01 | 7.043067E-01 | -4.938513E-01 |
| L4A1 | -4.684294E-01 | 2.465248E-01 | -4.139044E-02 | 3.224366E-02 |
| L4A2 | -1.306368E-01 | -1.991967E-02 | 4.384887E-02 | -9.494729E-03 |
| L5A1 | 2.712626E-02 | -1.141584E-02 | -5.265842E-03 | 1.474179E-03 |
| L5A2 | 8.329574E-03 | -8.519780E-04 | 1.810171E-04 | -1.507769E-04 |
| L6A1 | 9.006117E-03 | -6.912068E-03 | 1.392213E-03 | -9.401215E-05 |
| L6A2 | -4.385890E-02 | 1.703149E-02 | -4.513540E-03 | 7.894405E-04 |
| Surface # | a16 | a18 | a20 | |
| L1A1 | 1.118038E-01 | | | |
| L1A2 | 1.749365E-01 | | | |
| L2A1 | 2.891220E-01 | | | |
| L2A2 | -1.693045E-01 | | | |
| L3A1 | 9.755411E-02 | | | |
| L3A2 | 1.207522E-01 | | | |
| L4A1 | -2.267214E-02 | | | |
| L4A2 | -3.568866E-04 | | | |
| L5A1 | 1.561432E-03 | -3.908319E-05 | -1.393277E-04 | |
| L5A2 | -6.315017E-05 | 3.866586E-05 | -4.643082E-06 | |
| L6A1 | -9.672967E-07 | -1.419885E-07 | 5.153527E-08 | |
| L6A2 | -8.709340E-05 | 5.597130E-06 | -1.635466E-07 | |

FIG. 49

| Embodiment | 1st | 2nd | 3rd | 4th | 5th | 6th |
|---|---|---|---|---|---|---|
| T1 | 0.907 | 0.931 | 0.935 | 0.959 | 1.116 | 0.996 |
| G12 | 0.045 | 0.027 | 0.093 | 0.068 | 0.036 | 0.036 |
| T2 | 0.228 | 0.350 | 0.233 | 0.211 | 0.210 | 0.210 |
| G23 | 0.337 | 0.267 | 0.374 | 0.268 | 0.296 | 0.317 |
| T3 | 0.271 | 0.319 | 0.335 | 0.366 | 0.395 | 0.299 |
| G34 | 0.070 | 0.043 | 0.094 | 0.090 | 0.046 | 0.053 |
| T4 | 0.353 | 0.361 | 0.312 | 0.272 | 0.360 | 0.378 |
| G45 | 0.252 | 0.128 | 0.202 | 0.245 | 0.224 | 0.212 |
| T5 | 0.467 | 0.783 | 0.489 | 0.445 | 0.545 | 0.521 |
| G56 | 0.203 | 0.146 | 0.172 | 0.151 | 0.213 | 0.105 |
| T6 | 0.403 | 0.402 | 0.367 | 0.456 | 0.280 | 0.497 |
| G6F | 0.700 | 0.700 | 0.700 | 0.700 | 0.700 | 0.700 |
| TTF | 0.210 | 0.210 | 0.210 | 0.210 | 0.210 | 0.210 |
| GFP | 0.178 | 0.081 | 0.253 | 0.379 | 0.143 | 0.321 |
| BFL | 1.088 | 0.991 | 1.163 | 1.289 | 1.053 | 1.231 |
| EFL | 3.786 | 3.797 | 3.939 | 3.935 | 3.857 | 3.937 |
| TL | 3.536 | 3.757 | 3.607 | 3.531 | 3.720 | 3.625 |
| TTL | 4.624 | 4.748 | 4.770 | 4.820 | 4.773 | 4.856 |
| ALT | 2.629 | 3.147 | 2.672 | 2.708 | 2.906 | 2.901 |
| AAG | 0.907 | 0.610 | 0.935 | 0.823 | 0.815 | 0.724 |
| V4 | 23.529 | 23.529 | 23.529 | 23.529 | 23.529 | 22.409 |
| V5 | 55.987 | 55.987 | 55.987 | 55.987 | 55.987 | 55.745 |
| V6 | 55.987 | 55.987 | 55.987 | 55.987 | 55.987 | 55.745 |
| T1/AAG | 1.000 | 1.525 | 1.000 | 1.165 | 1.370 | 1.376 |
| ALT/BFL | 2.416 | 3.177 | 2.297 | 2.100 | 2.760 | 2.357 |
| EFL/(T4+T6) | 5.006 | 4.975 | 5.802 | 5.405 | 6.023 | 4.500 |
| TL/(T3+T6) | 5.242 | 5.209 | 5.137 | 4.300 | 5.515 | 4.552 |
| BFL/AAG | 1.200 | 1.623 | 1.244 | 1.567 | 1.292 | 1.700 |
| (T3+T4)/T2 | 2.738 | 1.940 | 2.777 | 3.031 | 3.600 | 3.226 |
| (T1+G12+T2)/(T3+G34+T4) | 1.700 | 1.809 | 1.700 | 1.700 | 1.700 | 1.700 |
| TTL/T1 | 5.100 | 5.100 | 5.100 | 5.027 | 4.276 | 4.874 |
| ALT/(T2+T3) | 5.266 | 4.700 | 4.700 | 4.700 | 4.808 | 5.695 |
| EFL/(G45+T5) | 5.268 | 4.168 | 5.700 | 5.700 | 5.015 | 5.370 |
| (TL+BFL)/(G23+G56) | 8.565 | 11.500 | 8.733 | 11.500 | 9.386 | 11.500 |
| AAG/(G45+G56) | 1.994 | 2.226 | 2.500 | 2.077 | 1.864 | 2.281 |
| (G45+G56)/G23 | 1.348 | 1.028 | 1.000 | 1.477 | 1.478 | 1.000 |
| (T1+T5)/(T3+T4) | 2.200 | 2.520 | 2.200 | 2.200 | 2.200 | 2.239 |
| ALT/(T1+G12) | 2.762 | 3.287 | 2.599 | 2.636 | 2.522 | 2.811 |
| EFL/(G23+G56) | 7.013 | 9.198 | 7.211 | 9.387 | 7.585 | 9.323 |
| TL/(T2+G23) | 6.256 | 6.087 | 5.940 | 7.374 | 7.361 | 6.874 |
| BFL/(G12+G34+T6) | 2.100 | 2.100 | 2.100 | 2.100 | 2.910 | 2.100 |
| (G45+T5)/(G34+T4) | 1.700 | 2.256 | 1.700 | 1.904 | 1.893 | 1.700 |
| V4+V5+V6 | 135.503 | 135.503 | 135.503 | 135.503 | 135.503 | 133.899 |

FIG. 50A

| Embodiment | 7th | 8th | 9th | 10th | 11th |
|---|---|---|---|---|---|
| T1 | 0.951 | 1.101 | 0.956 | 0.930 | 1.048 |
| G12 | 0.044 | 0.036 | 0.053 | 0.037 | 0.036 |
| T2 | 0.210 | 0.210 | 0.210 | 0.241 | 0.210 |
| G23 | 0.272 | 0.246 | 0.347 | 0.298 | 0.293 |
| T3 | 0.218 | 0.295 | 0.379 | 0.310 | 0.234 |
| G34 | 0.101 | 0.071 | 0.051 | 0.062 | 0.045 |
| T4 | 0.318 | 0.354 | 0.252 | 0.292 | 0.334 |
| G45 | 0.271 | 0.228 | 0.208 | 0.278 | 0.240 |
| T5 | 0.577 | 0.560 | 0.655 | 0.568 | 0.575 |
| G56 | 0.136 | 0.200 | 0.180 | 0.181 | 0.177 |
| T6 | 0.415 | 0.347 | 0.314 | 0.353 | 0.364 |
| G6F | 0.700 | 0.700 | 0.700 | 0.700 | 0.700 |
| TTF | 0.210 | 0.210 | 0.210 | 0.210 | 0.210 |
| GFP | 0.274 | 0.169 | 0.149 | 0.152 | 0.184 |
| BFL | 1.184 | 1.079 | 1.059 | 1.062 | 1.094 |
| EFL | 4.085 | 3.878 | 3.781 | 3.781 | 3.852 |
| TL | 3.513 | 3.649 | 3.605 | 3.548 | 3.556 |
| TTL | 4.698 | 4.728 | 4.664 | 4.609 | 4.650 |
| ALT | 2.688 | 2.867 | 2.765 | 2.693 | 2.764 |
| AAG | 0.825 | 0.782 | 0.839 | 0.854 | 0.792 |
| V4 | 23.529 | 23.529 | 23.529 | 23.529 | 23.529 |
| V5 | 55.987 | 55.987 | 55.987 | 55.987 | 55.987 |
| V6 | 55.987 | 55.987 | 55.987 | 55.987 | 55.987 |
| T1/AAG | 1.152 | 1.409 | 1.139 | 1.088 | 1.324 |
| ALT/BFL | 2.270 | 2.657 | 2.611 | 2.537 | 2.526 |
| EFL/(T4+T6) | 5.575 | 5.530 | 6.684 | 5.865 | 5.524 |
| TL/(T3+T6) | 5.553 | 5.681 | 5.206 | 5.348 | 5.952 |
| BFL/AAG | 1.435 | 1.380 | 1.262 | 1.243 | 1.382 |
| (T3+T4)/T2 | 2.551 | 3.094 | 3.005 | 2.499 | 2.702 |
| (T1+G12+T2)/(T3+G34+T4) | 1.892 | 1.869 | 1.787 | 1.819 | 2.113 |
| TTL/T1 | 4.942 | 4.293 | 4.879 | 4.958 | 4.437 |
| ALT/(T2+T3) | 6.279 | 5.678 | 4.700 | 4.887 | 6.230 |
| EFL/(G45+T5) | 4.817 | 4.923 | 4.377 | 4.472 | 4.727 |
| (TL+BFL)/(G23+G56) | 11.500 | 10.605 | 8.848 | 9.633 | 9.875 |
| AAG/(G45+G56) | 2.025 | 1.828 | 2.163 | 1.865 | 1.898 |
| (G45+G56)/G23 | 1.498 | 1.737 | 1.117 | 1.537 | 1.422 |
| (T1+T5)/(T3+T4) | 2.850 | 2.558 | 2.556 | 2.488 | 2.861 |
| ALT/(T1+G12) | 2.701 | 2.520 | 2.742 | 2.788 | 2.550 |
| EFL/(G23+G56) | 10.000 | 8.699 | 7.173 | 7.902 | 8.181 |
| TL/(T2+G23) | 7.286 | 8.000 | 6.471 | 6.584 | 7.063 |
| BFL/(G12+G34+T6) | 2.114 | 2.373 | 2.534 | 2.352 | 2.460 |
| (G45+T5)/(G34+T4) | 2.024 | 1.851 | 2.848 | 2.393 | 2.152 |
| V4+V5+V6 | 135.503 | 135.503 | 135.503 | 135.503 | 135.503 |

FIG. 50B

OPTICAL IMAGING LENS

CROSS-REFERENCE TO RELATED APPLICATIONS

This application claims priority to P.R.C. Patent Application No. 201911407999.0 titled "Optical Imaging Lens," filed Dec. 31, 2019, with the State Intellectual Property Office of the People's Republic of China (SIPO).

TECHNICAL FIELD

The present disclosure relates to optical imaging lenses, and particularly, optical imaging lenses having, in some embodiments, six lens elements.

BACKGROUND

Recently, as the specifications of optical imaging lenses rapidly evolve, more applications are feasible. Slim and thin in sizes and great field of view are two essential requirements. To provide a great vision, current mobile electronic devices persue all-screen, and this makes the area of an optical imaging lens among the screen smaller and smaller in proportion. However, contradictorily, the area of current optical imaging lenses among the screen is great in proportion to facilitate great field of view. Therefore, consumer's requirement is not satisfied. Accordingly, achieving great field of view and smaller front surface area of optical imaging lenses at the same time may be a challenge in the industry.

SUMMARY

The present disclosure provides for optical imaging lenses showing great field of view and being capable to provide a smaller front surface area.

In an example embodiment, an optical imaging lens may comprise six lens elements, hereinafter referred to as first, second, third, fourth, fifth and sixth lens elements and positioned sequentially from an object side to an image side along an optical axis. Each of the first, second, third, fourth, fifth and sixth lens element may also have an object-side surface facing toward the object side and allowing imaging rays to pass through and an image-side surface facing toward the image side and allowing the imaging rays to pass through.

In the specification, parameters used here are defined as follows: a thickness of the first lens element along the optical axis is represented by T1, a distance from the image-side surface of the first lens element to the object-side surface of the second lens element along the optical axis is represented by G12, a thickness of the second lens element along the optical axis is represented by T2, a distance from the image-side surface of the second lens element to the object-side surface of the third lens element along the optical axis is represented by G23, a thickness of the third lens element along the optical axis is represented by T3, a distance from the image-side surface of the third lens element to the object-side surface of the fourth lens element along the optical axis is represented by G34, a thickness of the fourth lens element along the optical axis is represented by T4, a distance from the image-side surface of the fourth lens element to the object-side surface of the fifth lens element along the optical axis is represented by G45, a thickness of the fifth lens element along the optical axis is represented by T5, a distance from the image-side surface of the fifth lens element to the object-side surface of the sixth lens element along the optical axis is represented by G56, a thickness of the sixth lens element along the optical axis is represented by T6, a distance from the image-side surface of the sixth lens element to the object-side surface of the filtering unit along the optical axis is represented by G6F, a thickness of the filtering unit along the optical axis is represented by TTF, a distance from the image-side surface of the filtering unit to the image plane along the optical axis is represented by GFP, a focal length of the first lens element is represented by f1, a focal length of the second lens element is represented by f2, a focal length of the third lens element is represented by f3, a focal length of the fourth lens element is represented by f4, a focal length of the fifth lens element is represented by f5, a focal length of the sixth lens element is represented by f6, an refractive index of the first lens element is represented by n1, an refractive index of the second lens element is represented by n2, an refractive index of the third lens element is represented by n3, an refractive index of the fourth lens element is represented by n4, an refractive index of the fifth lens element is represented by n5, an refractive index of the sixth lens element is represented by n6, an abbe number of the first lens element is represented by V1, an abbe number of the second lens element is represented by V2, an abbe number of the third lens element is represented by V3, an abbe number of the fourth lens element is represented by V4, an abbe number of the fifth lens element is represented by V5, an abbe number of the sixth lens element is represented by V6, an effective focal length of the optical imaging lens is represented by EFL, a distance from the object-side surface of the first lens element to the image-side surface of the sixth lens element along the optical axis is represented by TL, a distance from the object-side surface of the first lens element to the image plane along the optical axis, i.e. a system length is represented by TTL, a sum of the thicknesses of all six lens elements along the optical axis, i.e. a sum of T1, T2, T3, T4, T5 and T6 is represented by ALT, a sum of five air gaps from the first lens element to the sixth lens element along the optical axis, which is also defined as a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis and a distance from the image-side surface of the fifth lens element to the object-side surface of the sixth lens element along the optical axis, i.e. a sum of five air gaps from the first lens element to the sixth lens element along the optical axis or a sum of G12, G23, G34, G45 and G56 is represented by AAG, a back focal length of the optical imaging lens, which is defined as the distance from the image-side surface of the sixth lens element to the image plane along the optical axis, i.e. a sum of G6F, TTF and GFP is represented by BFL, a half field of view of the optical imaging lens is represented by HFOV, an image height of the optical imaging lens is represented by ImgH, and a f-number of the optical imaging lens is represented by Fno.

In an aspect of the present disclosure, in the optical imaging lens, an optical axis region of the image-side surface of the first lens element may be convex, a periphery region of the object-side surface of the second lens element may be convex, a periphery region of the image-side surface of the fourth lens element may be convex, an optical axis region of the object-side surface of the sixth lens element may be concave, a periphery region of the image-side surface of the sixth lens element may be convex, lens elements having refracting power of the optical imaging lens may consist of the six lens elements described above and the optical imaging lens may satisfy the inequality:

$$T1/AAG \geq 1.000 \qquad \text{Inequality (1).}$$

In another aspect of the present disclosure, in the optical imaging lens, an optical axis region of the image-side surface of the first lens element may be convex, a periphery region of the image-side surface of the fourth lens element may be convex, an optical axis region of the object-side surface of the sixth lens element may be concave, a periphery region of the image-side surface of the sixth lens element may be convex, lens elements having refracting power of the optical imaging lens may consist of the six lens elements described above and the optical imaging lens may satisfy Inequality (1) and $$TTL/T1 \leq 5.100 \qquad \text{Inequality (2).}$$

In another aspect of the present disclosure, in the optical imaging lens, the first lens element may have positive refracting power, an optical axis region of the image-side surface of the first lens element may be convex, a periphery region of the object-side surface of the second lens element may be convex, an optical axis region of the image-side surface of the fourth lens element may be concave, a periphery region of the image-side surface of the fourth lens element may be convex, a periphery region of the image-side surface of the sixth lens element may be convex, lens elements having refracting power of the optical imaging lens may consist of the six lens elements described above and the optical imaging lens may satisfy Inequality (1).

In another example embodiment, other inequality(s), such as those relating to the ratio among parameters could be taken into consideration. For example:

$$ALT/BFL \geq 2.100 \qquad \text{Inequality (3);}$$

$$EFL/(T4+T6) \geq 4.500 \qquad \text{Inequality (4);}$$

$$TL/(T3+T6) \geq 4.300 \qquad \text{Inequality (5);}$$

$$BFL/AAG \leq 1.700 \qquad \text{Inequality (6);}$$

$$(T3+T4)/T2 \leq 3.600 \qquad \text{Inequality (7);}$$

$$(T1+G12+T2)/(T3+G34+T4) \geq 1.700 \qquad \text{Inequality (8);}$$

$$ALT/(T2+T3) \geq 4.700 \qquad \text{Inequality (9);}$$

$$EFL/(G45+T5) \leq 5.700 \qquad \text{Inequality (10);}$$

$$(TL+BFL)/(G23+G56) \leq 11.500 \qquad \text{Inequality (11);}$$

$$AAG/(G45+G56) \leq 2.500 \qquad \text{Inequality (12);}$$

$$(G45+G56)/G23 \geq 1.000 \qquad \text{Inequality (13);}$$

$$(T1+T5)/(T3+T4) \leq 2.200 \qquad \text{Inequality (14);}$$

$$ALT/(T1+G12) \leq 3.400 \qquad \text{Inequality (15);}$$

$$EFL/(G23+G56) \leq 10.000 \qquad \text{Inequality (16);}$$

$$TL/(T2+G23) \leq 8.000 \qquad \text{Inequality (17);}$$

$$BFL/(G12+G34+T6) \geq 2.100 \qquad \text{Inequality (18);}$$

$$(G45+T5)/(G34+T4) \geq 1.700 \qquad \text{Inequality (19); and/or}$$

$$V4+V5+V6 \leq 150.000 \qquad \text{Inequality (20).}$$

In some example embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated in example embodiments if no inconsistency occurs.

The above example embodiments are not limiting and could be selectively incorporated in other embodiments described herein.

The optical imaging lens in example embodiments may achieve great field of view and a smaller front surface area at the same time.

BRIEF DESCRIPTION OF THE DRAWINGS

Example embodiments will be more readily understood from the following detailed description when read in conjunction with the appended drawing, in which:

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 14 depicts a cross-sectional view of a third embodiment of an optical imaging lens having six lens elements according to the present disclosure;

FIG. 15 depicts a chart of a longitudinal spherical aberration and other kinds of optical aberrations of a third embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 26 depicts a cross-sectional view of a sixth embodiment of an optical imaging lens having six lens elements according to the present disclosure;

FIG. 27 depicts a chart of a longitudinal spherical aberration and other kinds of optical aberrations of a sixth embodiment of the optical imaging lens according the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of an eighth embodiment of an optical imaging lens according to the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 44 depicts a table of optical data for each lens element of a tenth embodiment of an optical imaging lens according to the present disclosure;

FIG. 45 depicts a table of aspherical data of a tenth embodiment of the optical imaging lens according to the present disclosure;

FIG. 48 depicts a table of optical data for each lens element of an eleventh embodiment of an optical imaging lens according to the present disclosure;

FIG. 49 depicts a table of aspherical data of an eleventh embodiment of the optical imaging lens according to the present disclosure;

FIGS. 50A and 50B depict tables for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of all eleven example embodiments.

DETAILED DESCRIPTION

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

The terms "optical axis region", "periphery region", "concave", and "convex" used in this specification and claims should be interpreted based on the definition listed in the specification by the principle of lexicographer.

Figure 1:
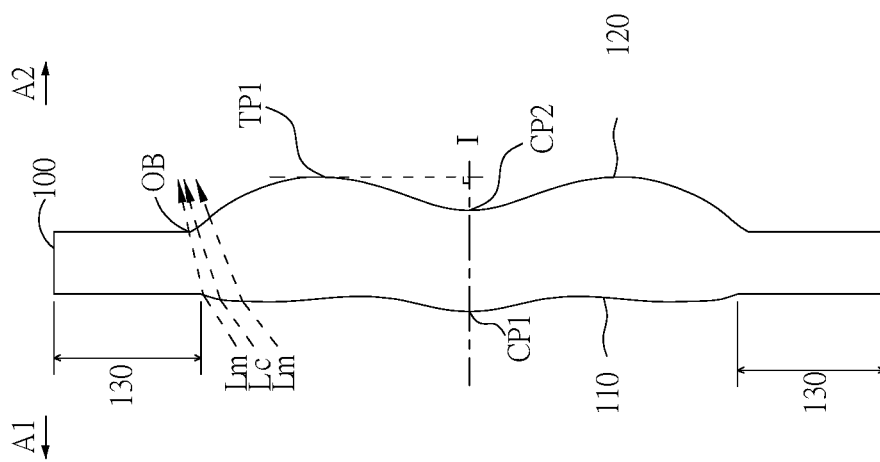
FIG. 1 depicts a cross-sectional view of one single lens element according to the present disclosure.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
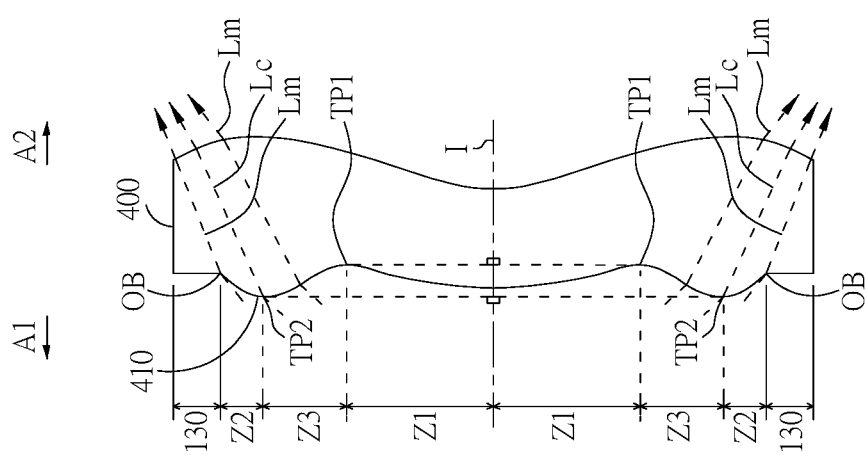
FIG. 4 depicts a cross-sectional view showing a second example of determining the shape of lens element regions and the boundaries of regions.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
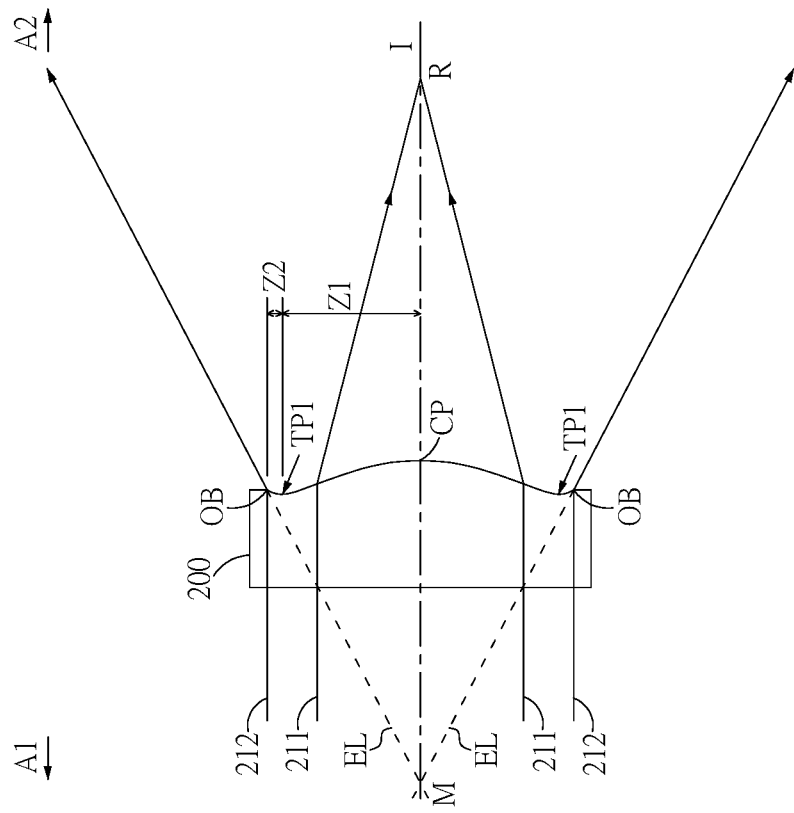
FIG. 2 depicts a cross-sectional view showing the relation between the shape of a portion and the position where a collimated ray meets the optical axis.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
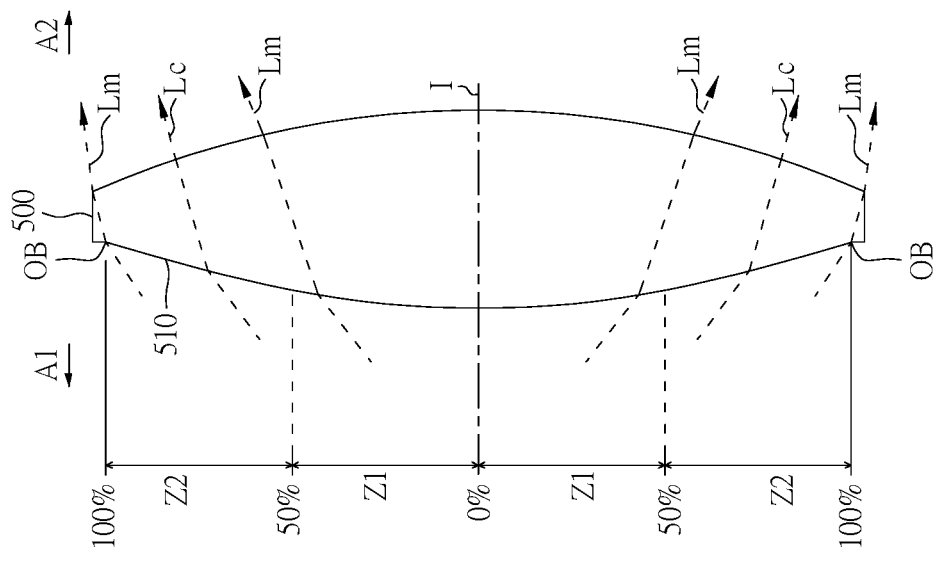
FIG. 5 depicts a cross-sectional view showing a third example of determining the shape of lens element regions and the boundaries of regions.
Figure 3:
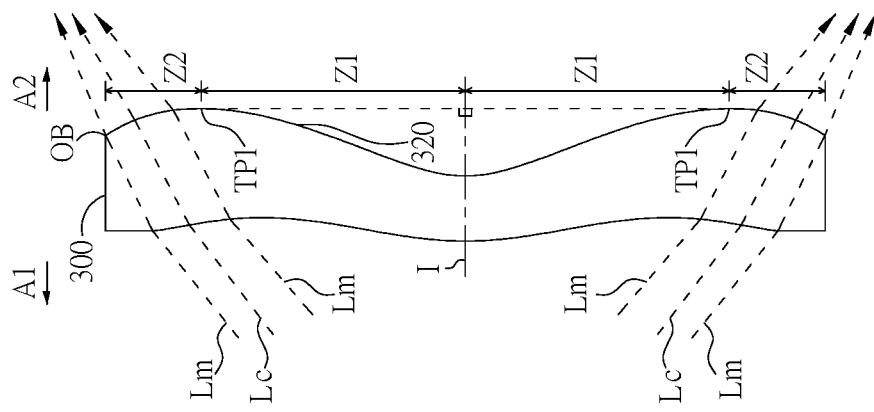
FIG. 3 depicts a cross-sectional view showing a first example of determining the shape of lens element regions and the boundaries of regions.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

In the present disclosure, examples of an optical imaging lens which may be a prime lens are provided. Example embodiments of an optical imaging lens may comprise a first lens element, a second lens element, a third lens element, a fourth lens element, a fifth lens element and a sixth lens element. Each of the lens elements may comprise an object-side surface facing toward an object side allowing imaging rays to pass through and an image-side surface facing toward an image side allowing the imaging rays to pass through. These lens elements may be arranged sequentially from the object side to the image side along an optical axis, and example embodiments of the lens may have refracting power of the optical imaging lens consist of the six lens elements described above. Through controlling shape of the surfaces and range of the parameters, the optical imaging lens in example embodiments may achieve great field of view and smaller front surface area.

In some embodiments, the lens elements are designed in light of the optical characteristics, system length, f-number, image height, front surface area and/or field of view of the optical imaging lens. For example the convex optical axis region of the image-side surface of the first lens element, the convex periphery region of the object-side surface of the second lens element, the convex periphery region of the image-side surface of the fourth lens element and the convex periphery region of the image-side surface of the sixth lens element, together with $T1/AAG \geq 1.000$ satisfied and either group of: (1) the concave optical axis region of the object-side surface of the sixth lens element and (2) the positive refracting power of the first lens element and the concave optical axis region of the image-side surface of the fourth lens element, it may be beneficial to adjust longitudinal spherical aberration, curvature of field and distortion aberration and reduce the front surface area. Preferably, the optical imaging lens may satisfy $1.000 \leq T1/AAG \leq 1.700$. Surface shapes of the convex optical axis region of the image-side surface of the first lens element, the convex periphery region of the image-side surface of the fourth lens element, the concave optical axis region of the object-side surface of the sixth lens element, the convex periphery region of the image-side surface of the sixth lens element, together with satisfying $TTL/T1 \leq 5.100$ and $T1/AAG \geq 1.000$, it may be beneficial to reduce the front surface area of an optical imaging lens. When $TTL/T1 \leq 5.100$ is satisfied, the system length of an optical imaging lens may be effectively controlled to slim and small sizes. Preferably, the optical imaging lens may satisfy $1.000 \leq T1/AAG \leq 1.700$ and/or $3.800 \leq TTL/T1 \leq 5.100$.

With proper material chosen, when $V4+V5+V6 \leq 150.000$ is satisfied, chromatic aberration may be effectively reduced. Preferably, the optical imaging lens may satisfy $120.000 \leq V4+V5+V6 \leq 150.000$.

Through controlling T1, and choosing proper values for thickness of other lens elements or distance of air gaps, the optical imaging lens may satisfy $(T1+G12+T2)/(T3+G34+T4) \geq 1.700$, $(T1+T5)/(T3+T4) \geq 2.200$ and/or $ALT/(T1+G12) \leq 3.400$ to further reduce the front surface area. Preferably, the optical imaging lens may satisfy $1.700 \leq (T1+G12+T2)/(T3+G34+T4) \leq 2.300$, $2.200 \leq (T1+T5)/(T3+T4) \leq 3.100$ and/or $2.200 \leq ALT/(T1+G12) \leq 3.400$.

When the optical imaging lens further satisfies at least one of $ALT/BFL \geq 2.100$, $EFL/(T4+T6) \geq 4.500$, $TL/(T3+T6) \geq 4.300$, $BFL/AAG \leq 1.700$, $(T3+T4)/T2 \leq 3.600$, $ALT/(T2+T3) \geq 4.700$, $EFL/(G45+T5) \leq 5.700$, $(TL+BFL)/(G23+G56) \leq 11.500$, $AAG/(G45+G56) \leq 2.500$, $(G45+G56)/G23 \geq 1.000$, $EFL/(G23+G56) \leq 10.000$, $TL/(T2+G23) \leq 8.000$, $BFL/(G12+G34+T6) \geq 2.100$ and $(G45+T5)/(G34+T4) \geq 1.700$, the thickness of the lens elements and/or the air gaps between the lens elements may be shortened properly to avoid any excessive value of the parameters which may be unfavorable and may thicken the system length of the whole system of the optical imaging lens, and to avoid any insufficient value of the parameters which may increase the production difficulty of the optical imaging lens. Preferably, the optical imaging lens may satisfy at least one of $2.100 \leq ALT/BFL \leq 3.500$, $4.500 \leq EFL/(T4+T6) \leq 7.300$, $4.300 \leq TL/(T3+T6) \leq 6.500$, $1.000 \leq BFL/AAG \leq 1.700$, $1.700 \leq (T3+T4)/T2 \leq 3.600$, $4.700 \leq ALT/(T2+T3) \leq 6.900$, $3.700 \leq EFL/(G45+T5) \leq 5.700$, $7.700 \leq (TL+BFL)/(G23+G56) \leq 11.500$, $1.600 \leq AAG/(G45+G56) \leq 2.500$, $1.000 \leq (G45+G56)/G23 \leq 1.900$, $6.300 \leq EFL/(G23+G56) \leq 10.000$, $5.300 \leq TL/(T2+G23) \leq 8.000$, $2.100 \leq BFL/(G12+G34+T6) \leq 3.200$ and $1.700 \leq (G45+T5)/(G34+T4) \leq 3.100$.

In light of the unpredictability in an optical system, satisfying these inequalities listed above may result in promoting the imaging quality, shortening the system length of the optical imaging lens, lowering the f-number, reducing front surface area, enlarging field of view and/or increasing the yield in the assembly process in the present disclosure.

When implementing example embodiments, more details about the convex or concave surface or refracting power could be incorporated for one specific lens element or broadly for a plurality of lens elements to improve the control for the system performance and/or resolution, or promote the yield. For example, in an example embodiment, each lens element may be made from all kinds of transparent material, such as glass, plastic, resin, etc. When a lens element is made from plastic, the weight and the cost are less. It is noted that the details listed here could be incorporated in example embodiments if no inconsistency occurs.

Figure 6:
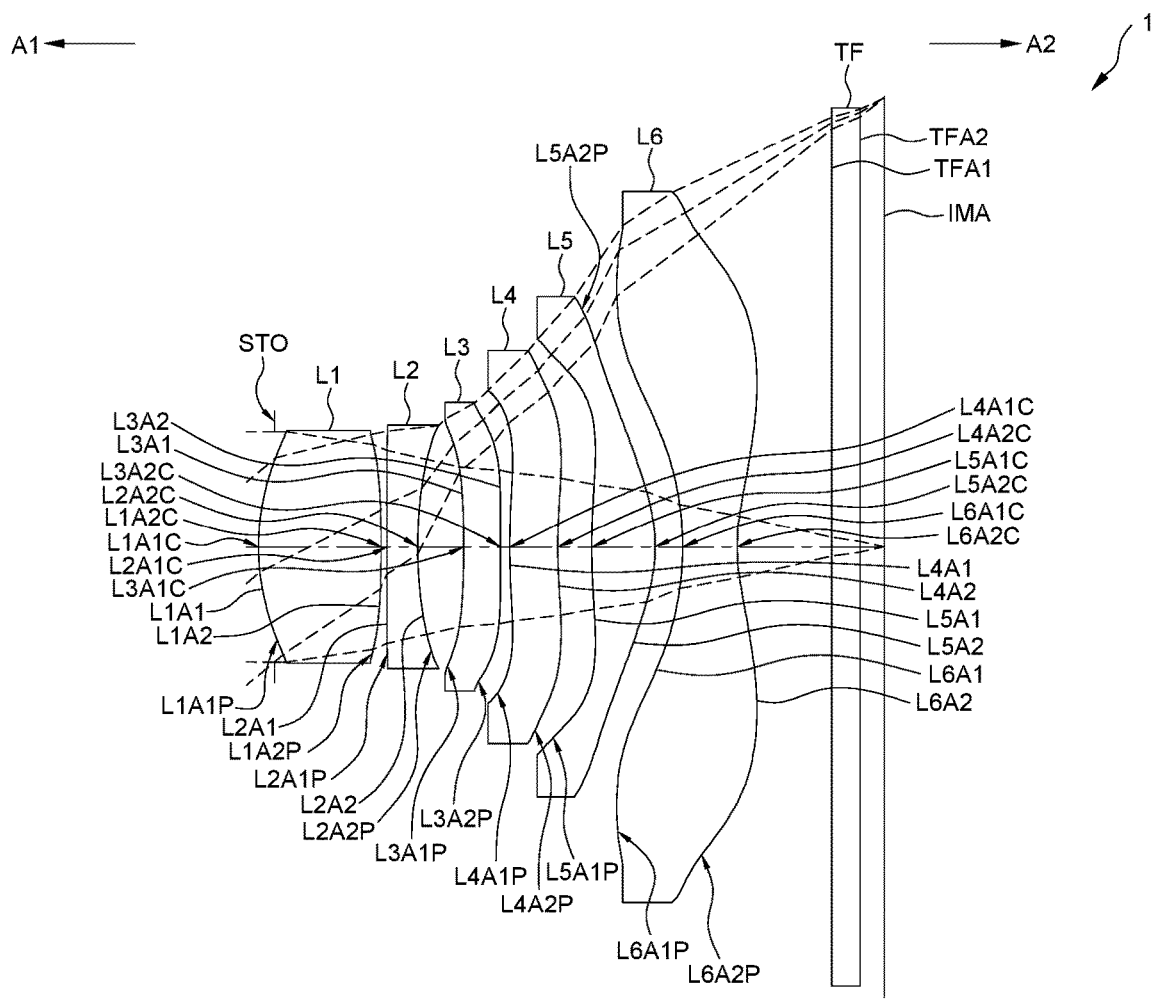
FIG. 6 depicts a cross-sectional view of a first embodiment of an optical imaging lens having six lens elements according to the present disclosure.
Figure 7:
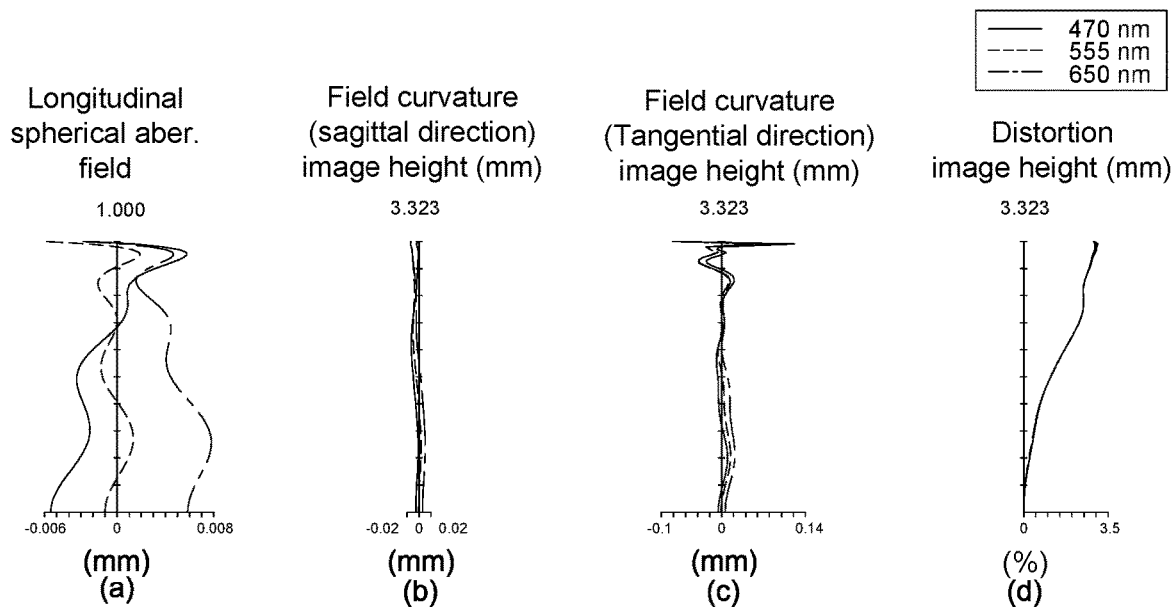
FIG. 7 depicts a chart of a longitudinal spherical aberration and other kinds of optical aberrations of a first embodiment of the optical imaging lens according to the present disclosure.

Several example embodiments and associated optical data will now be provided for illustrating example embodiments of an optical imaging lens with good optical characteristics, a wide view and/or a low f-number. Reference is now made to FIGS. 6-9. FIG. 6 illustrates an example cross-sectional view of an optical imaging lens 1 having six lens elements of the optical imaging lens according to a first example embodiment. FIG. 7 shows example charts of a longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in the order from an object side A1 to an image side A2 along an optical axis, an aperture stop STO, a first lens element L1, a second lens element L2, a third lens element L3, a fourth lens element L4, a fifth lens element L5 and a sixth lens element L6. A filtering unit TF and an image plane IMA of an image sensor may be positioned at the image side A2 of the optical lens 1. Each of the first, second, third, fourth, fifth and sixth lens element L1, L2, L3, L4, L5, L6 and the filtering unit TF may comprise an object-side surface L1A1/L2A1/L3A1/L4A1/L5A1/L6A1/TFA1 facing toward the object side A1 and an image-side surface L1A2/L2A2/L3A2/L4A2/L5A2/L6A2/TFA2 facing toward the image side A2. The filtering unit TF, positioned between the sixth lens element L6 and the image plane IMA, may selectively absorb light with specific wavelength(s) from the light passing through optical imaging lens 1. The example embodiment of the filtering unit TF which may selectively absorb light with specific wavelength(s) from the light passing through optical imaging lens 1 may be an IR cut filter (infrared cut filter). Then, IR light may be absorbed, and this may prohibit the IR light, which might not be seen by human eyes, from producing an image on the image plane IMA.

Example embodiments of each lens element of the optical imaging lens 1, which may be constructed by glass, plastic, resin material or other transparent material and is constructed by plastic material here for example, will now be described with reference to the drawings.

An example embodiment of the first lens element L1 may have positive refracting power. On the object-side surface L1A1, an optical axis region L1A1C may be convex and a periphery region L1A1P may be convex. On the image-side surface L1A2, an optical axis region L1A2C may be convex and a periphery region L1A2P may be convex. Both the object-side surface L1A1 and the image-side surface L1A2 of the optical imaging lens 1 are aspherical surfaces.

An example embodiment of the second lens element L2 may have negative refracting power. On the object-side surface L2A1, an optical axis region L2A1C may be convex and a periphery region L2A1P may be convex. On the image-side surface L2A2, an optical axis region L2A2C may be concave and a periphery region L2A2P may be concave. Both the object-side surface L2A1 and the image-side surface L2A2 of the optical imaging lens 1 are aspherical surfaces.

An example embodiment of the third lens element L3 may have negative refracting power. On the object-side surface L3A1, an optical axis region L3A1C may be concave and a periphery region L3A1P may be concave. On the image-side surface L3A2, an optical axis region L3A2C may be concave and a periphery region L3A2P may be convex. Both the object-side surface L3A1 and the image-side surface L3A2 of the optical imaging lens 1 are aspherical surfaces.

An example embodiment of the fourth lens element L4 may have negative refracting power. On the object-side surface L4A1, an optical axis region L4A1C may be convex and a periphery region L4A1P may be concave. On the image-side surface L4A2, an optical axis region L4A2C may be concave and a periphery region L4A2P may be convex. Both the object-side surface L4A1 and the image-side surface L4A2 of the optical imaging lens 1 are aspherical surfaces.

An example embodiment of the fifth lens element L5 may have positive refracting power. On the object-side surface L5A1, an optical axis region L5A1C may be convex and a periphery region L5A1P may be concave. On the image-side surface L5A2, an optical axis region L5A2C may be convex and a periphery region L5A2P may be convex. Both the object-side surface L5A1 and the image-side surface L5A2 of the optical imaging lens 1 are aspherical surfaces.

An example embodiment of the sixth lens element L6 may have negative refracting power. On the object-side surface L6A1, an optical axis region L6A1C may be concave and a periphery region L6A1P may be convex. On the image-side surface L6A2, an optical axis region L6A2C may be concave and a periphery region L6A2P may be convex. Both the object-side surface L6A1 and the image-side surface L6A2 of the optical imaging lens 1 are aspherical surfaces.

In example embodiments, air gaps may exist between each pair of adjacent lens elements, as well as between the sixth lens element L6 and the filtering unit TF, and the filtering unit TF and the image plane IMA of the image sensor. Please note, in other embodiments, any of the aforementioned air gaps may or may not exist. For example, profiles of opposite surfaces of a pair of adjacent lens elements may align with and/or attach to each other, and in such situations, the air gap might not exist.

FIG. 8 depicts the optical characteristics of each lens elements in the optical imaging lens 1 of the present embodiment. Please also refer to FIG. 50A for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 corresponding to the present embodiment.

The totaled 12 aspherical surfaces, including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, the object-side surface L5A1 and the image-side surface L5A2 of the fifth lens element L5, the object-side surface L6A1 and the image-side surface L6A2 of the sixth lens element L6 may all be defined by the following aspherical formula:

$$Z(Y) = \frac{Y^2}{R} / \left( 1 + \sqrt{1-(1+K)\frac{Y^2}{R^2}} \right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; $a_i$ represents an aspherical coefficient of $i^{th}$ level. The values of each aspherical parameter are shown in FIG. 9.

Referring to FIG. 7(a), a longitudinal spherical aberration of the optical imaging lens in the present embodiment is shown in coordinates in which the horizontal axis represents focus and the vertical axis represents field of view, and FIG. 7(b), curvature of field of the optical imaging lens in the present embodiment in the sagittal direction is shown in coordinates in which the horizontal axis represents focus and the vertical axis represents image height, and FIG. 7(c), curvature of field in the tangential direction of the optical imaging lens in the present embodiment is shown in coordinates in which the horizontal axis represents curvature of field and the vertical axis represents image height, and FIG. 7(d), distortion aberration of the optical imaging lens in the present embodiment is shown in coordinates in which the horizontal axis represents percentage and the vertical axis represents image height.

The curves of different wavelengths (470 nm, 555 nm, 650 nm) may be close to each other. This represents that off-axis light with respect to these wavelengths may be focused around an image point. From the vertical deviation of each curve shown therein, the offset of the off-axis light relative to the image point may be within −0.006~0.008 mm. Therefore, the present embodiment may improve the longitudinal spherical aberration with respect to different wavelengths. For curvature of field in the sagittal direction, the focus variation with respect to the three wavelengths in the whole field may fall within −0.02~0.02 mm, for curvature of field in the tangential direction, the focus variation with respect to the three wavelengths in the whole field may fall within −0.1~0.14 mm, and the variation of the distortion aberration may be within 0~3.5%.

According to the values of the aberrations, it is shown that the optical imaging lens 1 of the present embodiment, with the HFOV as large as 40.051 degrees and the system length as short as 4.624 mm, may be capable of providing good imaging quality as well as smaller front surface area.

Figure 10:
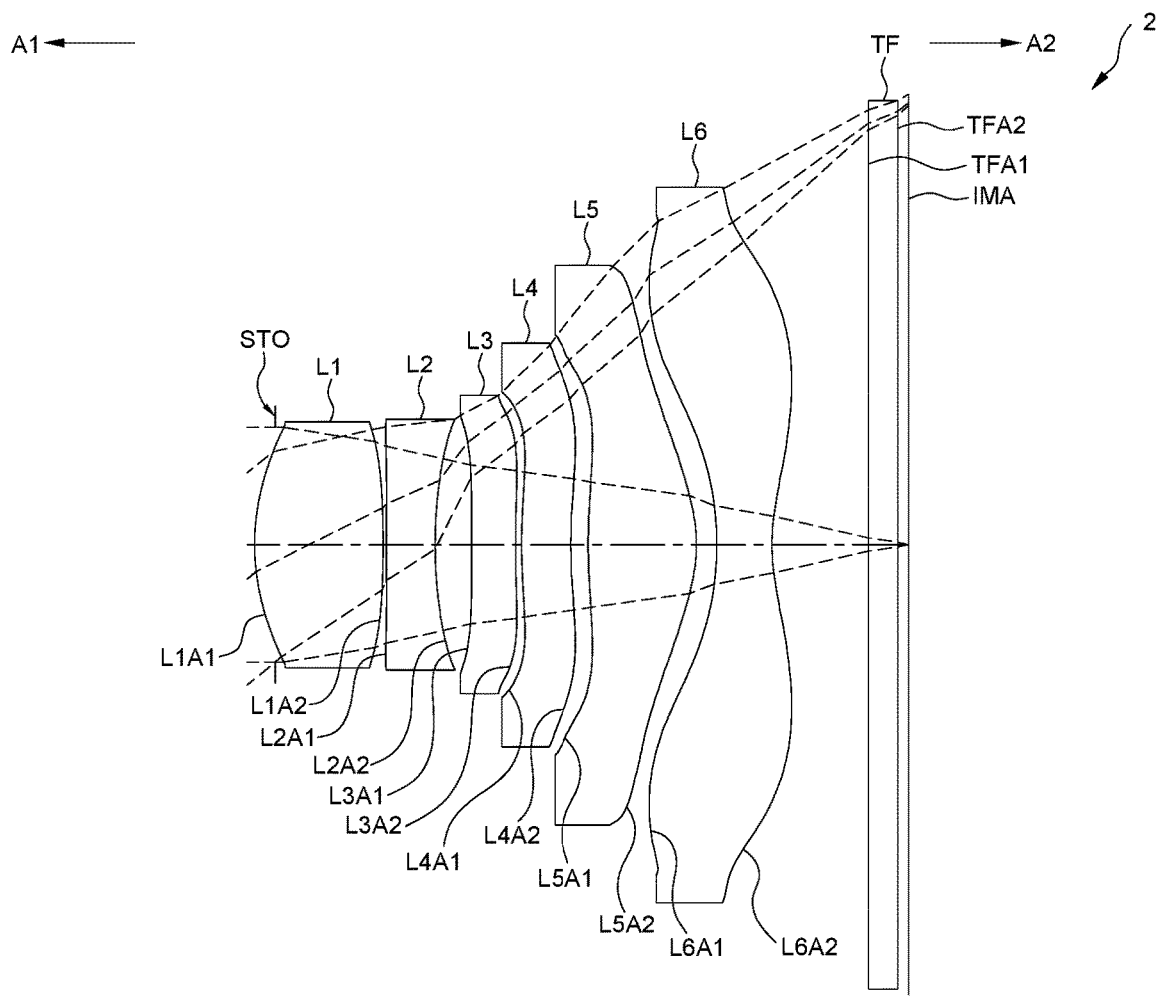
FIG. 10 depicts a cross-sectional view of a second embodiment of an optical imaging lens having six lens elements according to the present disclosure.
Figure 11:
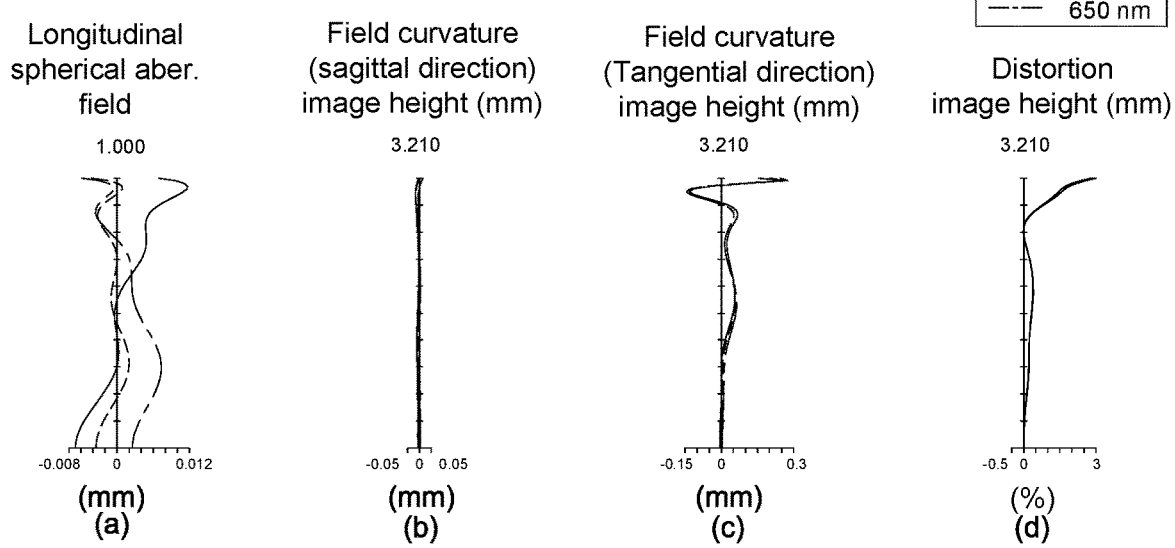
FIG. 11 depicts a chart of a longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having six lens elements of the optical imaging lens according to a second example embodiment. FIG. 11 shows example charts of a longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment.

As shown in FIG. 10, the optical imaging lens 2 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the second embodiment and the first embodiment may include the radius of curvature, thickness of each lens element, the value of each air gap, aspherical data and related optical parameters, such as back focal length; but the configuration of the concave/convex shape of surfaces, comprising the object-side surfaces L1A1, L2A1, L3A1, L4A1, L5A1 and L6A1 facing to the object side A1 and the image-side surfaces L1A2, L2A2, L3A2, L4A2, L5A2 and L6A2 facing to the image side A2, and positive or negative configuration of the refracting power of each lens element may be similar to those in the first embodiment. Please refer to FIG. 12 for the optical characteristics of each lens elements in the optical imaging lens 2 of the present embodiment, and please refer to FIG. 50A for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+

T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 11(a), the offset of the off-axis light relative to the image point may be within −0.008~0.012 mm. As the curvature of field in the sagittal direction shown in FIG. 11(b), the focus variation with regard to the three wavelengths in the whole field may fall within −0.05~0.05 mm. As the curvature of field in the tangential direction shown in FIG. 11(c), the focus variation with regard to the three wavelengths in the whole field may fall within −0.15~0.3 mm. As shown in FIG. 11(d), the variation of the distortion aberration may be within −0.5~3%.

According to the values of the aberrations, it is shown that the optical imaging lens 2 of the present embodiment, with the HFOV as large as 38.994 degrees and the system length as short as 4.748 mm, may be capable of providing good imaging quality as well as smaller front surface area.

Reference is now made to FIGS. 14-17. FIG. 14 illustrates an example cross-sectional view of an optical imaging lens 3 having six lens elements of the optical imaging lens according to a third example embodiment. FIG. 15 shows example charts of a longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment.

As shown in FIG. 14, the optical imaging lens 3 of the present embodiment, in an order from an object side A1 to an image side A2 along an optical axis, may comprise a an aperture stop STO, first lens element L1, a second lens element L2, a third lens element L3, a fourth lens element L4, a fifth lens element L5 and a sixth lens element L6.

The differences between the third embodiment and the first embodiment may include the radius of curvature and thickness of each lens element, the value of each air gap, aspherical data, related optical parameters, such as back focal length, and the configuration of the concave/convex shape of the object-side surface L2A1; but the configuration of the concave/convex shape of surfaces, comprising the object-side surfaces L1A1, L3A1, L4A1, L5A1 and L6A1 facing to the object side A1 and the image-side surfaces L1A2, L2A2, L3A2, L4A2, L5A2 and L6A2 facing to the image side A2, and positive or negative configuration of the refracting power of each lens element may be similar to those in the first embodiment. Here and in the embodiments hereinafter, for clearly showing the drawings of the present embodiment, only the surface shapes which are different from that in the first embodiment may be labeled. Specifically, the differences of configuration of surface shape may include: an optical axis region L2A1C on the object-side surface L2A1 of the second lens element L2 may be concave. Please refer to FIG. 16 for the optical characteristics of each lens elements in the optical imaging lens 3 of the present embodiment, and please refer to FIG. 50A for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 15(a), the offset of the off-axis light relative to the image point may be within −0.014~0.012 mm. As the curvature of field in the sagittal direction shown in FIG. 15(b), the focus variation with regard to the three wavelengths in the whole field may fall within −0.04~0.02 mm. As the curvature of field in the tangential direction shown in FIG. 15(c), the focus variation with regard to the three wavelengths in the whole field may fall within −0.08~0.14 mm. As shown in FIG. 15(d), the variation of the distortion aberration may be within 0~3.5%. Compared with the first embodiment, the curvature of field in the tangential direction may be smaller in the present embodiment.

According to the values of the aberrations, it is shown that the optical imaging lens 3 of the present embodiment, with the HFOV as large as 40.041 degrees and the system length as short as 4.770 mm, may be capable of providing good imaging quality as well as smaller front surface area.

Figure 18:
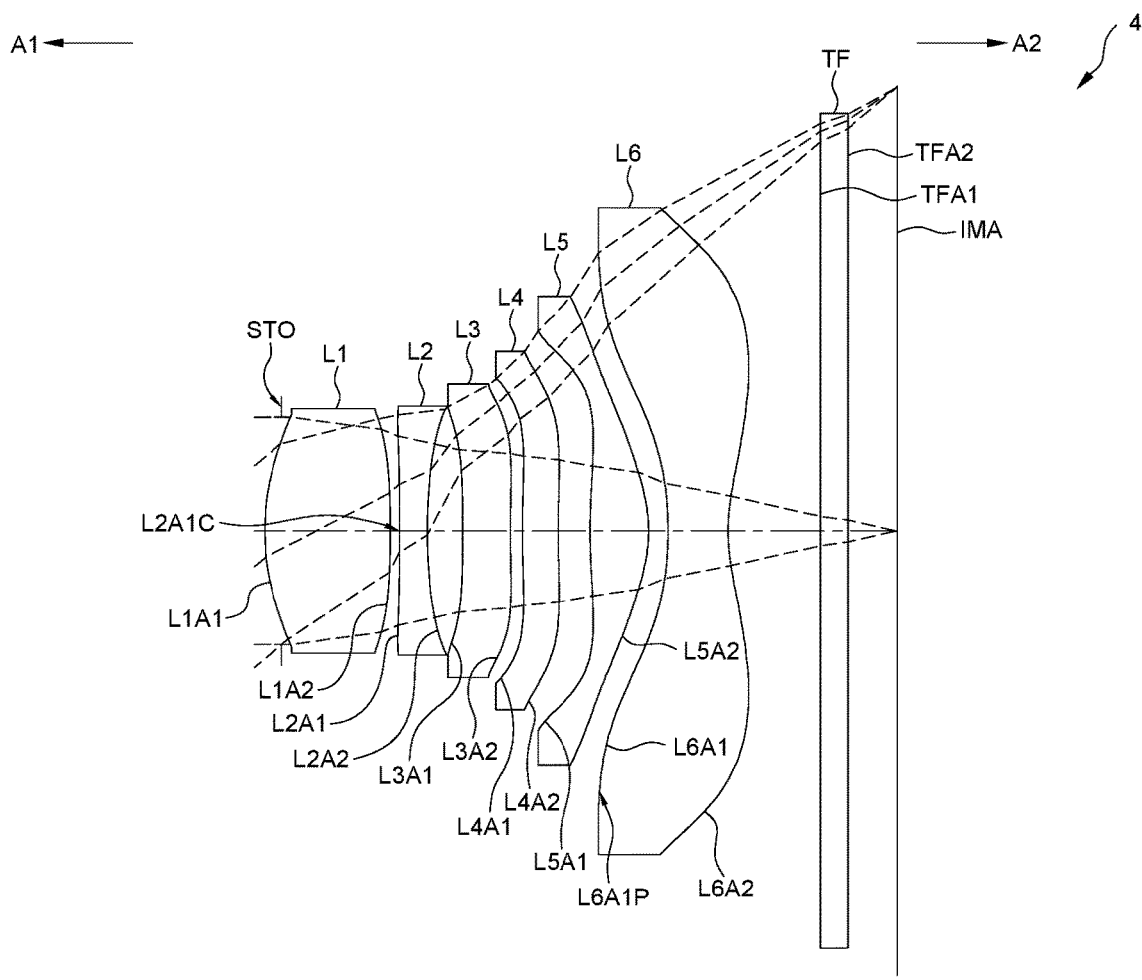
FIG. 18 depicts a cross-sectional view of a fourth embodiment of an optical imaging lens having six lens elements according to the present disclosure.
Figure 19:
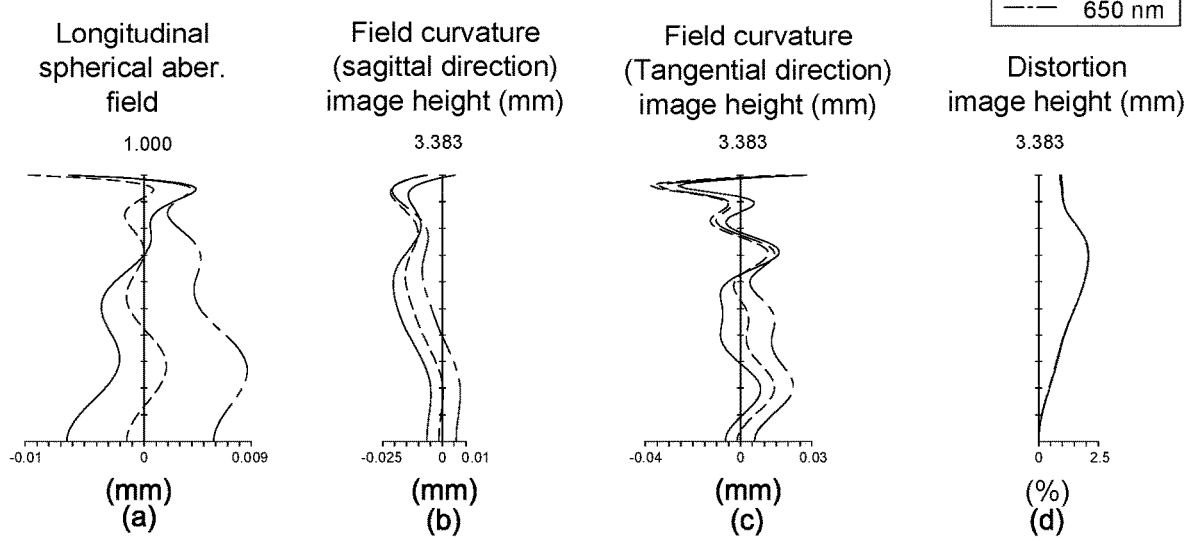
FIG. 19 depicts a chart of a longitudinal spherical aberration and other kinds of optical aberrations of a fourth embodiment of the optical imaging lens according to the present disclosure.

Reference is now made to FIGS. 18-21. FIG. 18 illustrates an example cross-sectional view of an optical imaging lens 4 having six lens elements of the optical imaging lens according to a fourth example embodiment. FIG. 19 shows example charts of a longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment.

As shown in FIG. 18, the optical imaging lens 4 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the fourth embodiment and the first embodiment may include the radius of curvature and thickness of each lens element, the value of each air gap, aspherical data, related optical parameters, such as back focal length, and the configuration of the concave/convex shape of the object-side surfaces L2A1, L6A1; but the configuration of the concave/convex shape of surfaces, comprising the object-side surfaces L1A1, L3A1, L4A1 and L5A1 facing to the object side A1 and the image-side surfaces L1A2, L2A2, L3A2, L4A2, L5A2 and L6A2 facing to the image side A2, and positive or negative configuration of the refracting power of each lens element may be similar to those in the first embodiment. Specifically, an optical axis region L2A1C on the object-side surface L2A1 of the second lens element L2 may be concave and a periphery axis region L6A1P on the object-side surface L6A1 of the sixth lens element L6 may be concave. Please refer to FIG. 20 for the optical characteristics of each lens elements in the optical imaging lens 4 of the present embodiment, please refer to FIG. 50A for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 19(a), the offset of the off-axis light relative to the image point may be within −0.01~0.009 mm. As the curvature of field in the sagittal direction shown in FIG. 19(b), the focus variation with regard to the three wavelengths in the whole field may fall within −0.025~0.01 mm. As the curvature of field in the tangential direction shown in FIG. 19(c), the focus variation with regard to the three wavelengths in the whole field may fall within −0.04~0.03 mm. As shown in FIG. 19(d), the variation of the distortion aberration may be within 0~2.5%. Compared with the first embodiment, the curvature of field in the sagittal direction and the distortion aberration may be smaller in the present embodiment.

According to the values of the aberrations, it is shown that the optical imaging lens 4 of the present embodiment, with the HFOV as large as 40.041 degrees and the system length as short as 4.820 mm, may be capable of providing good imaging quality as well as smaller front surface area.

Figure 22:
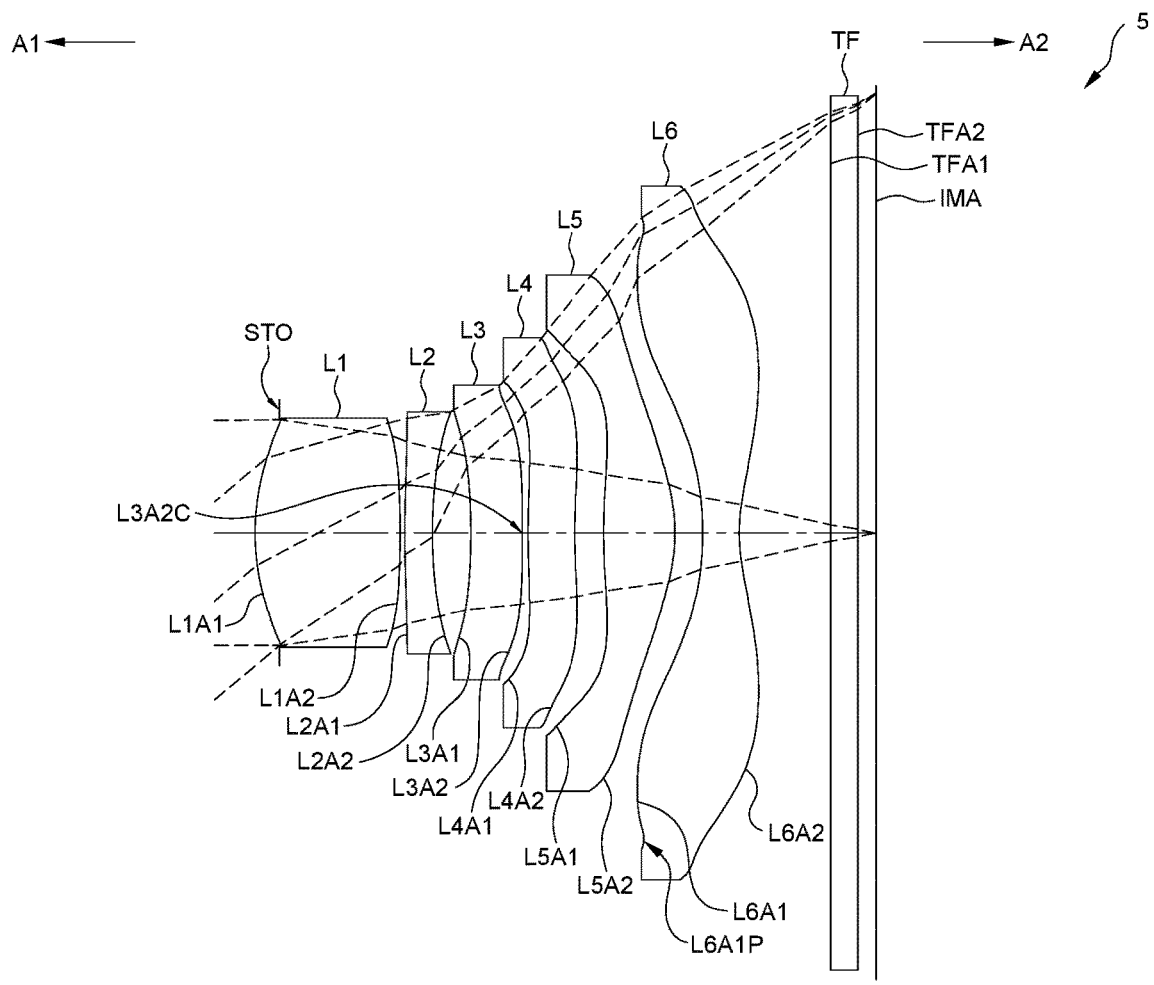
FIG. 22 depicts a cross-sectional view of a fifth embodiment of an optical imaging lens having six lens elements according to the present disclosure.
Figure 23:
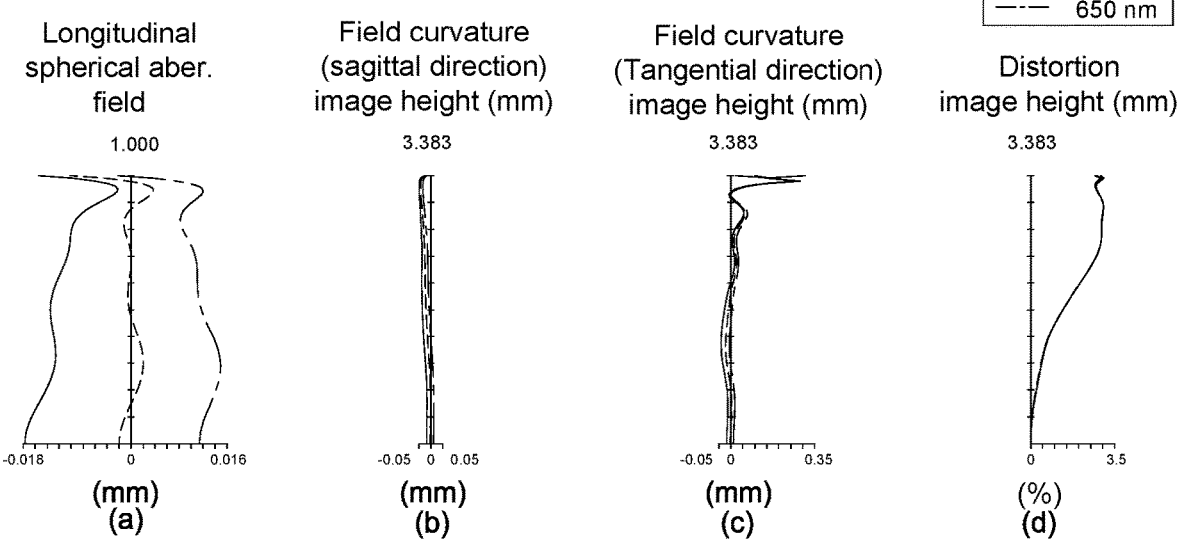
FIG. 23 depicts a chart of a longitudinal spherical aberration and other kinds of optical aberrations of a fifth embodiment of the optical imaging lens according to the present disclosure.

Reference is now made to FIGS. 22-25. FIG. 22 illustrates an example cross-sectional view of an optical imaging lens 5 having six lens elements of the optical imaging lens according to a fifth example embodiment. FIG. 23 shows example charts of a longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment.

As shown in FIG. 22, the optical imaging lens 5 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the fifth embodiment and the first embodiment may include the radius of curvature and thickness of each lens element, the value of each air gap, aspherical data, related optical parameters, such as back focal length, the configuration of the concave/convex shape of the object-side surface L6A1 and the image-side surface L3A2; but the configuration of the concave/convex shape of surfaces, comprising the object-side surfaces L1A1, L2A1, L3A1, L4A1 and L5A1 facing to the object side A1 and the image-side surfaces L1A2, L2A2, L4A2, L5A2 and L6A2 facing to the image side A2, and positive or negative configuration of the refracting power of each lens element may be similar to those in the first embodiment. Specifically, an optical axis region L3A2C on the image-side surface L3A2 of the third lens element L3 may be convex, and a periphery axis region L6A1P on the object-side surface L6A1 of the sixth lens element L6 may be concave. Please refer to FIG. 24 for the optical characteristics of each lens elements in the optical imaging lens 5 of the present embodiment, please refer to FIG. 50A for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 23(a), the offset of the off-axis light relative to the image point may be within −0.018~0.016 mm. As the curvature of field in the sagittal direction shown in FIG. 23(b), the focus variation with regard to the three wavelengths in the whole field may fall within −0.05~0.05 mm. As the curvature of field in the tangential direction shown in FIG. 23(c), the focus variation with regard to the three wavelengths in the whole field may fall within −0.05~0.35 mm. As shown in FIG. 23(d), the variation of the distortion aberration may be within 0~3.5%.

According to the values of the aberrations, it is shown that the optical imaging lens 5 of the present embodiment, with the HFOV as large as 40.041 degrees and the system length as short as 4.773 mm, may be capable of providing good imaging quality as well as smaller front surface area.

Reference is now made to FIGS. 26-29. FIG. 26 illustrates an example cross-sectional view of an optical imaging lens 6 having six lens elements of the optical imaging lens according to a sixth example embodiment. FIG. 27 shows example charts of a longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment.

As shown in FIG. 26, the optical imaging lens 6 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the sixth embodiment and the first embodiment may include the radius of curvature and thickness of each lens element, the value of each air gap, aspherical data and related optical parameters, such as back focal length; but the configuration of the concave/convex shape of surfaces, comprising the object-side surfaces L1A1, L2A1, L3A1, L4A1, L5A1 and L6A1 facing to the object side A1 and the image-side surfaces L1A2, L2A2, L3A2, L4A2, L5A2 and L6A2 facing to the image side A2, and positive or negative configuration of the refracting power of each lens element may be similar to those in the first embodiment. Please refer to FIG. 28 for the optical characteristics of each lens elements in the optical imaging lens 6 of the present embodiment, please refer to FIG. 50A for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (T1+T5)/(T3+T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 27(a), the offset of the off-axis light relative to the image point may be within −0.01~0.007 mm. As the curvature of field in the sagittal direction shown in FIG. 27(b), the focus variation with regard to the three wavelengths in the whole field may fall within −0.03~0.01 mm. As the curvature of field in the tangential direction shown in FIG. 27(c), the focus variation with regard to the three wavelengths in the whole field may fall within −0.02~0.05 mm. As shown in FIG. 27(d), the variation of the distortion aberration may be within 0~2%.

According to the values of the aberrations, it is shown that the optical imaging lens 6 of the present embodiment, with the HFOV as large as 40.041 degrees and the system length as short as 4.856 mm, may be capable of providing good imaging quality as well as smaller front surface area.

Figure 30:
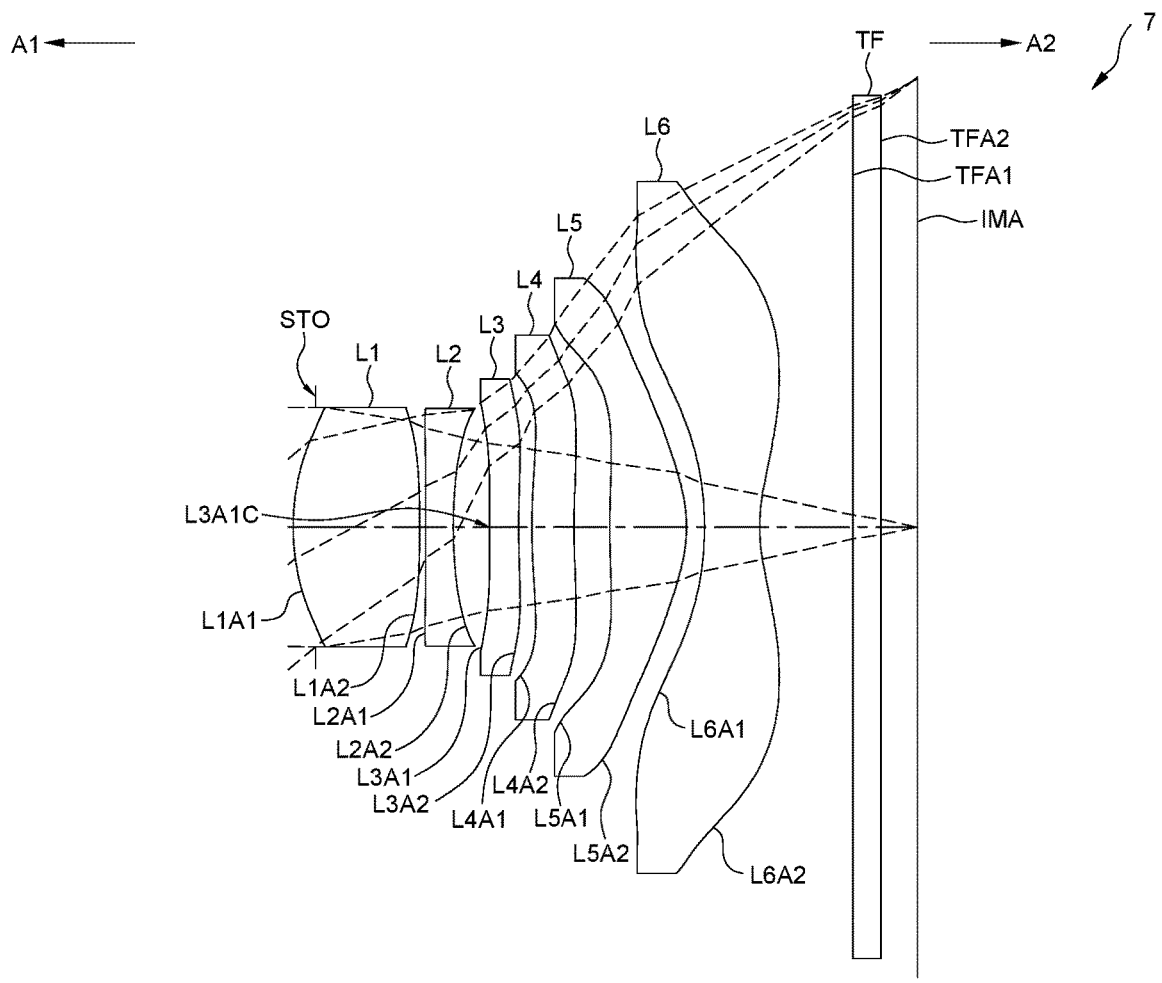
FIG. 30 depicts a cross-sectional view of a seventh embodiment of an optical imaging lens having six lens elements according to the present disclosure.
Figure 31:
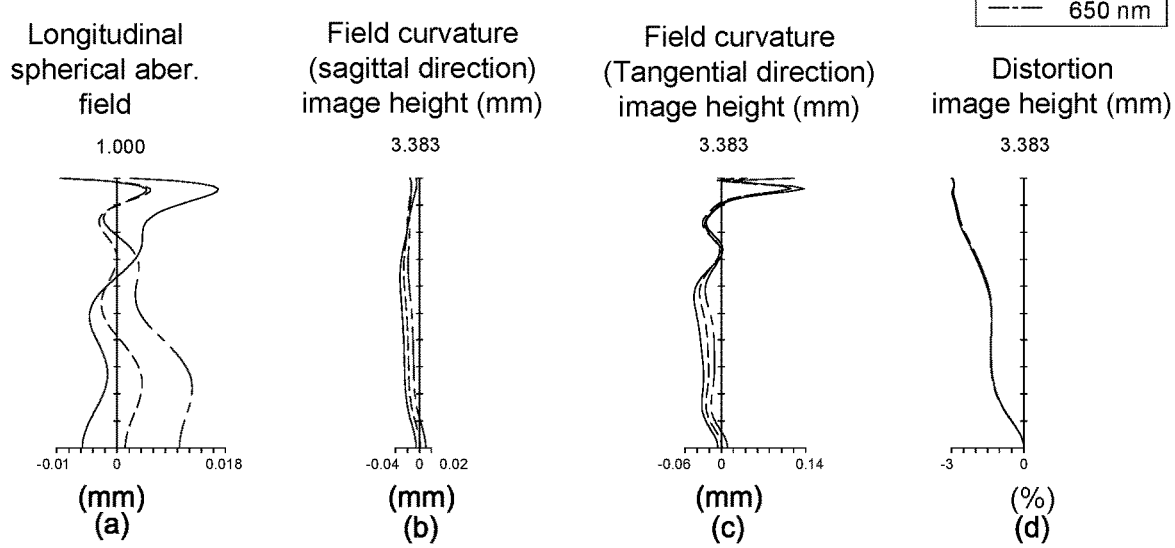
FIG. 31 depicts a chart of a longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having six lens elements of the optical imaging lens according to a seventh example embodiment. FIG. 31 shows example charts of a longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment.

As shown in FIG. 30, the optical imaging lens 7 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the seventh embodiment and the first embodiment may include the radius of curvature and thickness of each lens element, the value of each air gap, aspherical data, related optical parameters, such as back focal length, and the configuration of the concave/convex shape of the object-side surface L3A1; but the configuration of the concave/convex shape of surfaces, comprising the object-side surfaces L1A1, L2A1, L4A1, L5A1 and L6A1 facing to the object side A1 and the image-side surfaces L1A2, L2A2, L3A2, L4A2, L5A2 and L6A2 facing to the image side A2, and positive or negative configuration of the refracting power of each lens element other may be similar to those in the first embodiment. Specifically, an optical axis region L3A1C on the object-side surface L3A1 of the third lens element L3 may be convex. Please refer to FIG. 32 for the optical characteristics of each lens elements in the optical imaging lens 7 of the present embodiment, please refer to FIG. 50B for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 31(a), the offset of the off-axis light relative to the image point may be within −0.01~0.018 mm. As the curvature of field in the sagittal direction shown in FIG. 31(b), the focus variation with regard to the three wavelengths in the whole field may fall within −0.04~0.02 mm. As the curvature of field in the tangential direction shown in FIG. 31(c), the focus variation with regard to the three wavelengths in the whole field may fall within −0.06~0.14 mm. As shown in FIG. 31(d), the variation of the distortion aberration may be within −3~0%. Compared with the first embodiment, the curvature of field in the tangential direction and the distortion aberration may be smaller in the present embodiment.

According to the values of the aberrations, it is shown that the optical imaging lens 7 of the present embodiment, with the HFOV as large as 40.041 degrees and the system length as short as 4.698 mm, may be capable of providing good imaging quality as well as smaller front surface area.

Figure 34:
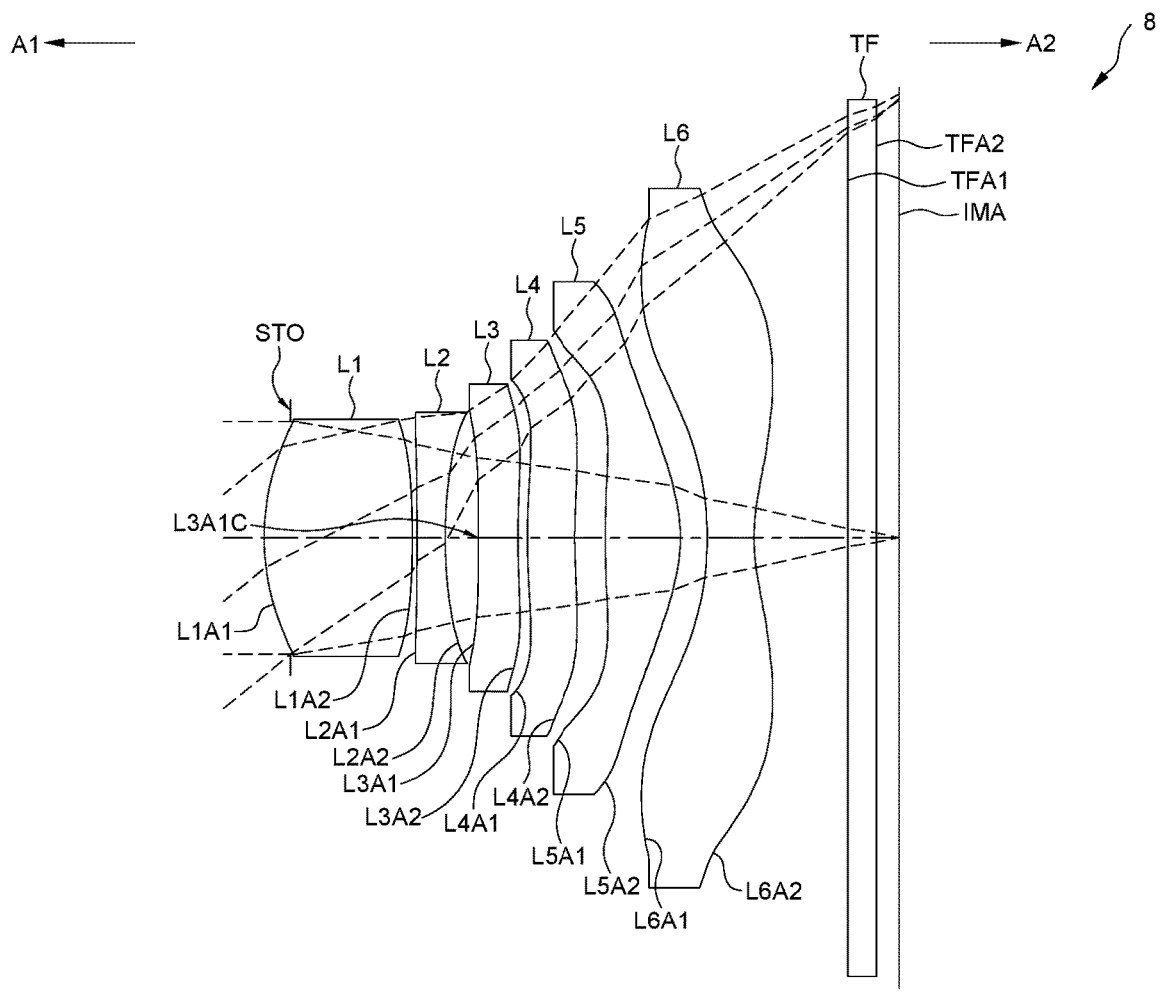
FIG. 34 depicts a cross-sectional view of an eighth embodiment of an optical imaging lens having six lens elements according to the present disclosure.
Figure 35:
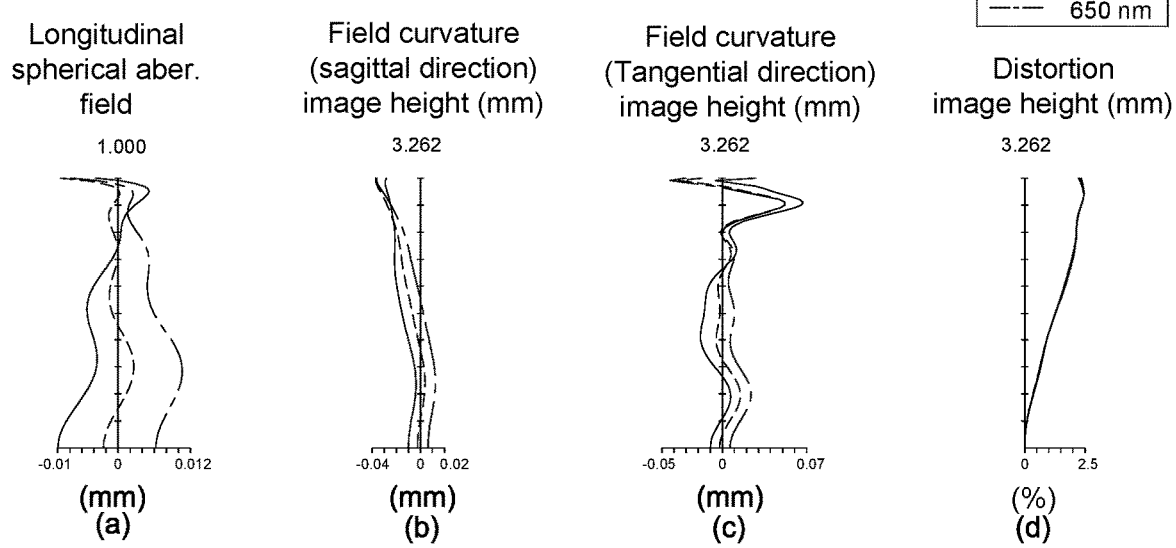
FIG. 35 depicts a chart of a longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having six lens elements of the optical imaging lens according to an eighth example embodiment. FIG. 35 shows example charts of a longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment.

As shown in FIG. 34, the optical imaging lens 8 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the eighth embodiment and the first embodiment may include the radius of curvature and thickness of each lens element, the value of each air gap, aspherical data, related optical parameters, such as back focal length, and the configuration of the concave/convex shape of the object-side surface L3A1; but the configuration of the concave/convex shape of surfaces comprising the object-side surfaces L1A1, L2A1, L4A1, L5A1 and L6A1 facing to the object side A1 and the image-side surfaces L1A2, L2A2, L3A2, L4A2, L5A2 and L6A2 facing to the image side A2, and positive or negative configuration of the refracting power of each lens element may be similar to those in the first embodiment. Specifically, an optical axis region L3A1C on the object-side surface L3A1 of the third lens element L3 may be convex. Please refer to FIG. 36 for the optical characteristics of each lens elements in the optical imaging lens 8 of the present embodiment, and please refer to FIG. 50B for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 35(a), the offset of the off-axis light relative to the image point may be within −0.01~0.012 mm. As the curvature of field in the sagittal direction shown in FIG. 35(b), the focus variation with regard to the three wavelengths in the whole field may fall within −0.04~0.02 mm. As the curvature of field in the tangential direction shown in FIG. 35(c), the focus variation with regard to the three wavelengths in the whole field may fall within −0.05~0.07 mm. As shown in FIG. 35(d), the variation of the distortion aberration may be within 0~2.5%. Compared with the first embodiment, the curvature of field in the tangential direction and the distortion aberration may be smaller here.

According to the values of the aberrations, it is shown that the optical imaging lens 8 of the present embodiment, with the HFOV as large as 38.994 degrees and the system length as short as 4.728 mm, may be capable of providing good imaging quality as well as smaller front surface area.

Figure 38:
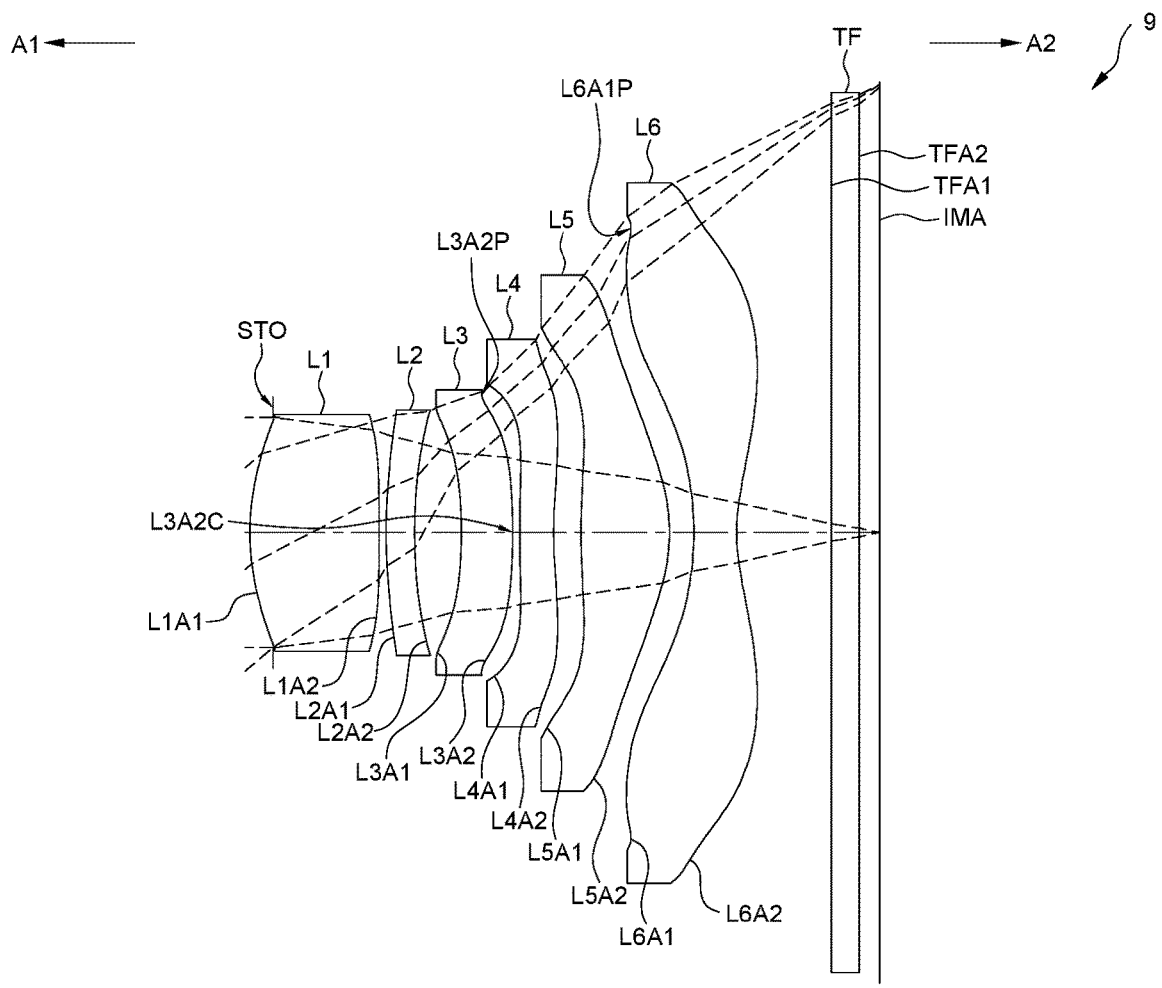
FIG. 38 depicts a cross-sectional view of a ninth embodiment of an optical imaging lens having six lens elements according to the present disclosure.
Figure 39:
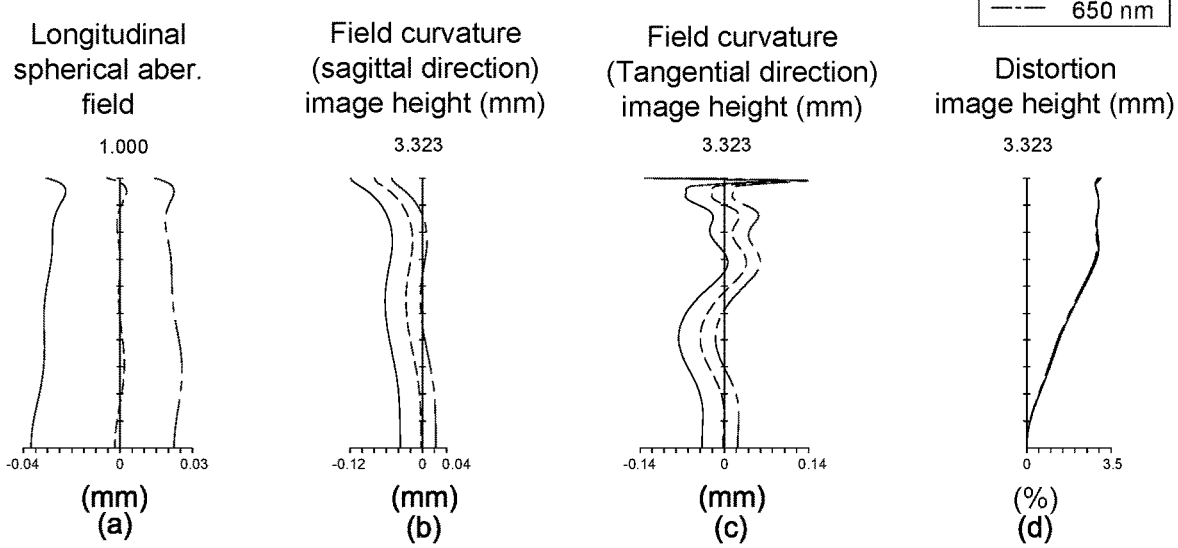
FIG. 39 depicts a chart of a longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having six lens elements of the optical imaging lens according to a ninth example embodiment. FIG. 39 shows example charts of a longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment.

As shown in FIG. 38, the optical imaging lens 9 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the ninth embodiment and the first embodiment may include the radius of curvature and thickness of each lens element, the value of each air gap, aspherical data, related optical parameters, such as back focal length, the configuration of the concave/convex shape of the object-side surface L6A1 and the image-side surface L3A2, and the positive refracting power of the second lens element L2; but the configuration of the concave/convex shape of surfaces comprising the object-side surfaces L1A1, L2A1, L3A1, L4A1 and L5A1 facing to the object side A1 and the image-side surfaces L1A2, L2A2, L4A2, L5A2 and L6A2 facing to the image side A2, and positive or negative configuration of the refracting power of the lens elements other than the second lens element L2 may be similar to those in the first embodiment. Specifically, an optical axis region L3A2C on the image-side surface L3A2 of the third lens element L3 may be convex, a periphery region L3A2P on the image-side surface L3A2 of the third lens element L3 may be concave and a periphery region L6A1P on the object-side surface L6A1 of the sixth lens element L6 may be concave. Please refer to FIG. 40 for the optical characteristics of each lens elements in the optical imaging lens 9 of the present embodiment, please refer to FIG. 50B for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 39(a), the offset of the off-axis light relative to the image point may be within −0.04~0.03 mm. As the curvature of field in the sagittal direction shown in FIG. 39(b), the focus variation with regard to the three wavelengths in the whole field may fall within −0.12~0.04 mm. As the curvature of field in the tangential direction shown in FIG. 39(c), the focus variation with regard to the three wavelengths in the whole field may fall within −0.14~0.14 mm. As shown in FIG. 39(d), the variation of the distortion aberration may be within 0~3.5%.

According to the values of the aberrations, it is shown that the optical imaging lens 9 of the present embodiment, with the HFOV as large as 40.051 degrees and the system length as short as 4.664 mm, may be capable of providing good imaging quality as well as smaller front surface area.

Figure 42:
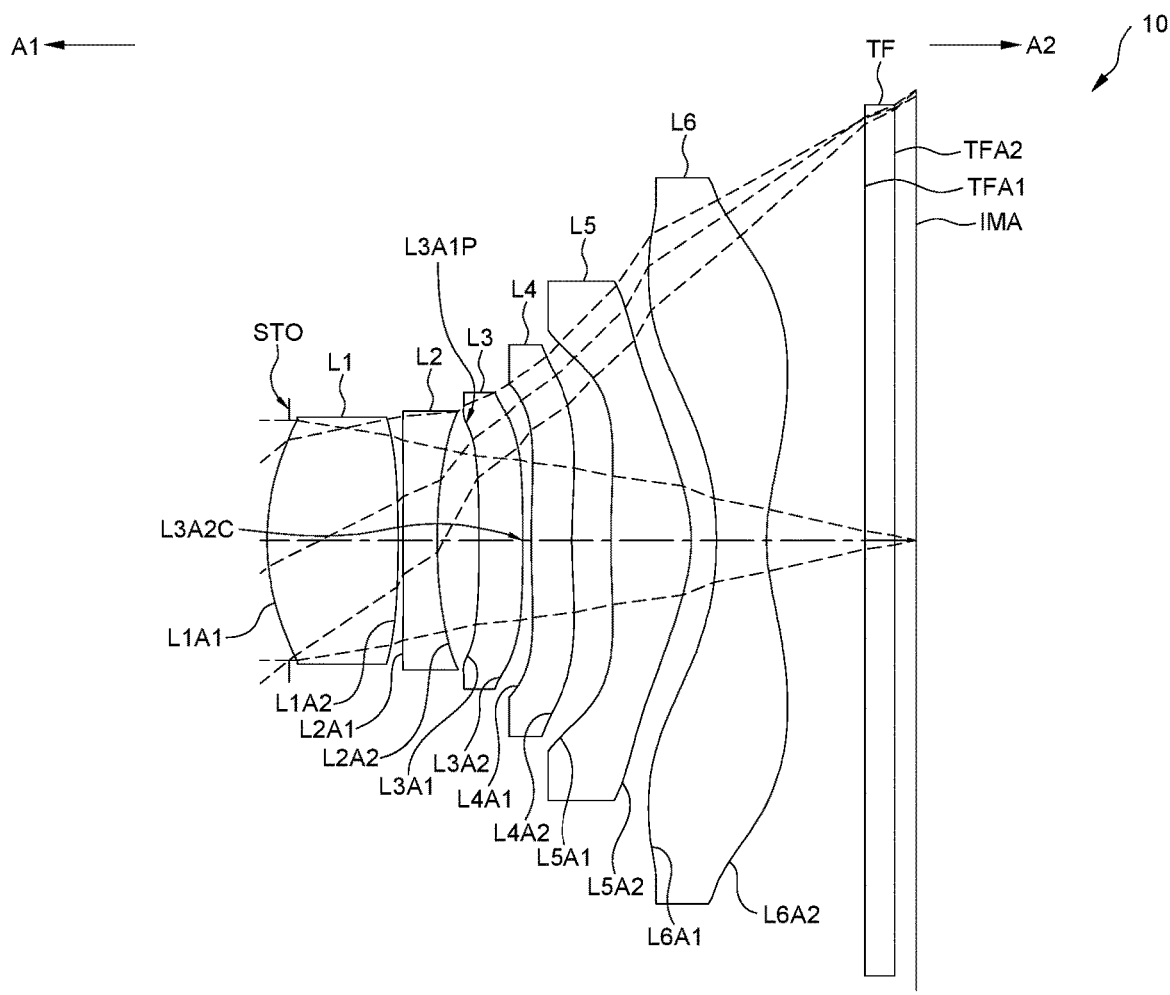
FIG. 42 depicts a cross-sectional view of a tenth embodiment of an optical imaging lens having six lens elements according to the present disclosure.
Figure 43:
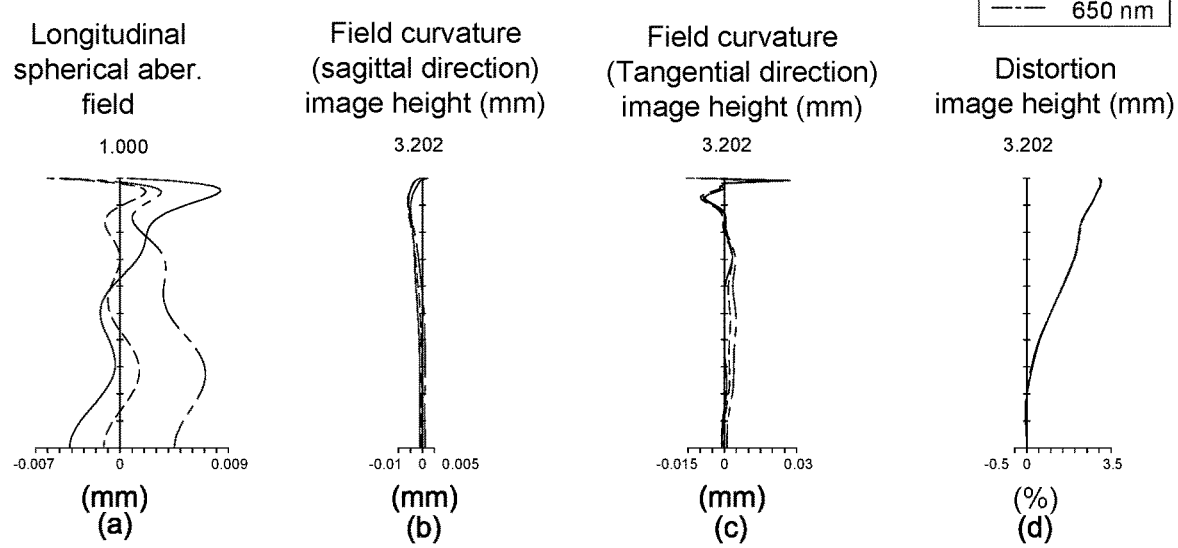
FIG. 43 depicts a chart of a longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 having six lens elements of the optical imaging lens according to a tenth example embodiment. FIG. 43 shows example charts of a longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment.

As shown in FIG. 42, the optical imaging lens 10 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the tenth embodiment and the first embodiment may include the radius of curvature and thickness of each lens element, the value of each air gap, aspherical data, related optical parameters, such as back focal length, the configuration of the concave/convex shape of the object-side surface L3A1 and the image-side surface L3A2, and the positive refracting power of the third lens element L3; but the configuration of the concave/convex shape of surfaces comprising the object-side surfaces L1A1, L2A1, L4A1, L5A1 and L6A1 facing to the object side A1 and the image-side surfaces L1A2, L2A2, L4A2, L5A2 and L6A2 facing to the image side A2, and positive or negative configuration of the refracting power of the lens elements other than the third lens element L3 may be similar to those in the first embodiment. Specifically, the differences of configuration of surface shape may include: a periphery region L3A1P on the object-side surface L3A1 of the third lens element L3 may be convex and an optical axis region L3A2C on the image-side surface L3A2 of the third lens element L3 may be convex. Please refer to FIG. 44 for the optical characteristics of each lens elements in the optical imaging lens 10 of the present embodiment, and please refer to FIG. 50B for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 43(a), the offset of the off-axis light relative to the image point may be within −0.007~0.009 mm. As the curvature of field in the sagittal direction shown in FIG. 43(b), the focus variation with regard to the three wavelengths in the whole field may fall within −0.025~0.005 mm. As the curvature of field in the tangential direction shown in FIG. 43(c), the focus variation with regard to the three wavelengths in the whole field may fall within −0.04~0.02 mm. As shown in FIG. 43(d), the variation of the distortion aberration may be within −0.5~3.5%. Compared with the first embodiment, the curvatures of field in both the sagittal and tangential directions are smaller.

According to the values of the aberrations, it is shown that the optical imaging lens 10 of the present embodiment, with the HFOV as large as 38.994 degrees and the system length as short as 4.609 mm, may be capable of providing good imaging quality as well as smaller front surface area. Compared with the first embodiment, the system length of the optical imaging lens 10 in the present embodiment may be shorter.

Figure 46:
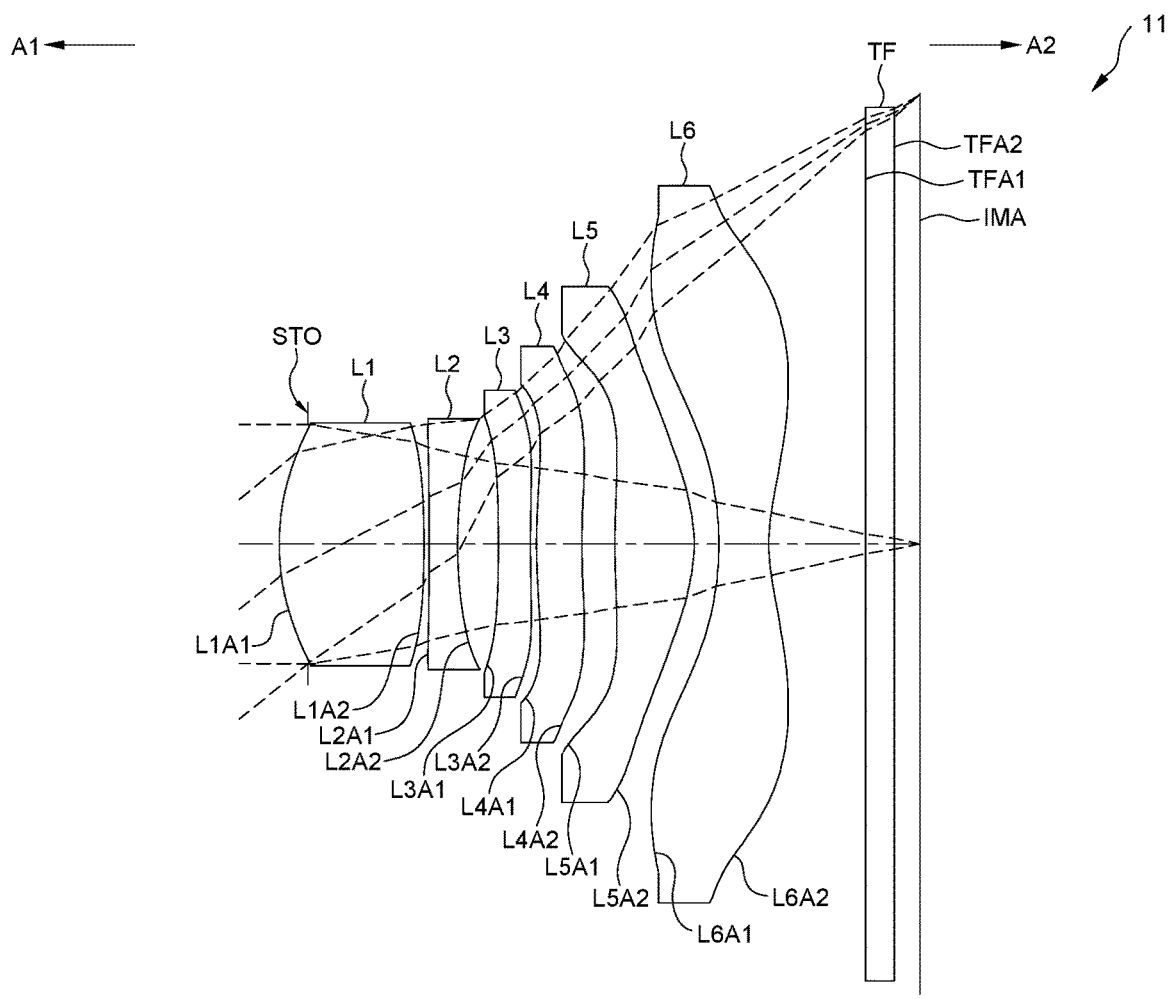
FIG. 46 depicts a cross-sectional view of an eleventh embodiment of an optical imaging lens having six lens elements according to the present disclosure.
Figure 47:
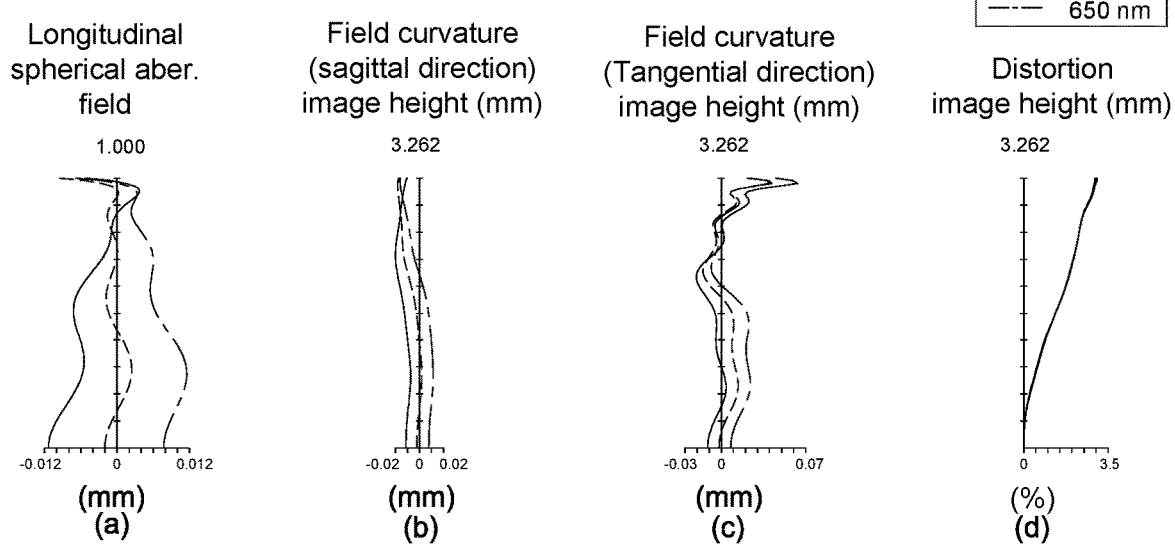
FIG. 47 depicts a chart of a longitudinal spherical aberration and other kinds of optical aberrations of an eleventh embodiment of the optical imaging lens according to the present disclosure.

Reference is now made to FIGS. 46-49. FIG. 46 illustrates an example cross-sectional view of an optical imaging lens 11 having six lens elements of the optical imaging lens according to an eleventh example embodiment. FIG. 47 shows example charts of a longitudinal spherical aberration and other kinds of optical aberrations of the optical imaging lens 11 according to the eleventh embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment.

As shown in FIG. 46, the optical imaging lens 11 of the present embodiment, in an order from an object side A1 to an image side A2 along an optical axis, may comprise an aperture stop STO, a first lens element L1, a second lens element L2, a third lens element L3, a fourth lens element L4, a fifth lens element L5 and a sixth lens element L6.

The differences between the eleventh embodiment and the first embodiment may include the radius of curvature and thickness of each lens element, the value of each air gap, aspherical data and related optical parameters, such as back focal length and the positive refracting power of the fourth lens element L4; but the configuration of the concave/convex shape of surfaces comprising the object-side surfaces L1A1, L2A1, L3A1, L4A1, L5A1 and L6A1 facing to the object side A1 and the image-side surfaces L1A2, L2A2, L3A2, L4A2, L5A2 and L6A2 facing to the image side A2, and positive or negative configuration of the refracting power of the lens elements other than the fourth lens element L4 may be similar to those in the first embodiment. Please refer to FIG. 48 for the optical characteristics of each lens elements in the optical imaging lens 11 of the present embodiment, and please refer to FIG. 50B for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of the present embodiment.

As the longitudinal spherical aberration shown in FIG. 47(a), the offset of the off-axis light relative to the image point may be within −0.012~0.012 mm. As the curvature of field in the sagittal direction shown in FIG. 47(b), the focus variation with regard to the three wavelengths in the whole field may fall within −0.02~0.02 mm. As the curvature of field in the tangential direction shown in FIG. 47(c), the focus variation with regard to the three wavelengths in the whole field may fall within −0.03~0.07 mm. As shown in FIG. 47(d), the variation of the distortion aberration may be within 0~3.5%. Compared with the first embodiment, the curvature of field in the tangential direction is smaller.

According to the values of the aberrations, it is shown that the optical imaging lens 11 of the present embodiment, with the HFOV as large as 38.994 degrees and the system length as short as 4.650 mm, may be capable of providing good imaging quality as well as smaller front surface area.

Please refer to FIGS. 50A and 50B for the values of T1/AAG, TTL/T1, ALT/BFL, EFL/(T4+T6), TL/(T3+T6), BFL/AAG, (T3+T4)/T2, (T1+G12+T2)/(T3+G34+T4), ALT/(T2+T3), EFL/(G45+T5), (TL+BFL)/(G23+G56), AAG/(G45+G56), (G45+G56)/G23, (T1+T5)/(T3+T4), ALT/(T1+G12), EFL/(G23+G56), TL/(T2+G23), BFL/(G12+G34+T6), (G45+T5)/(G34+T4) and V4+V5+V6 of all eleven embodiments, and the optical imaging lens of the present disclosure may satisfy at least one of the Inequalities (1), (2) and/or Inequalities (3)~(20). Further, any range of which the upper and lower limits defined by the values disclosed in all of the embodiments herein may be implemented in the present embodiments.

According to above illustration, the longitudinal spherical aberration, curvature of field in both the sagittal direction and tangential direction and distortion aberration in all embodiments may meet the user requirement of a related product in the market. The off-axis light with regard to three different wavelengths (470 nm, 555 nm, 650 nm) may be focused around an image point and the offset of the off-axis light relative to the image point may be well controlled with suppression for the longitudinal spherical aberration, curvature of field both in the sagittal direction and tangential direction and distortion aberration. The curves of different wavelengths may be close to each other, and this represents that the focusing for light having different wavelengths may be good to suppress chromatic dispersion. In summary, lens elements are designed and matched for achieving good imaging quality.

While various embodiments in accordance with the disclosed principles are described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Further, all of the numerical ranges including the maximum and minimum values and the values therebetween which are obtained from the combining proportion relation of the optical parameters disclosed in each embodiment of the present disclosure are implementable.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising a first element, a second element, a third element, a fourth element, a fifth lens element and a sixth lens element sequentially from an object side to an image side along an optical axis, each of the first, second, third, fourth, fifth and sixth lens element having an object-side surface facing toward the object side and allowing imaging rays to pass through and an image-side surface facing toward the image side and allowing the imaging rays to pass through, wherein:

an optical axis region of the image-side surface of the first lens element is convex;

a periphery region of the object-side surface of the second lens element is convex;

a periphery region of the image-side surface of the fourth lens element is convex;

an optical axis region of the object-side surface of the sixth lens element is concave;

a periphery region of the image-side surface of the sixth lens element is convex;

lens elements having refracting power of the optical imaging lens consist of the six lens elements described above; and a thickness of the first lens element along the optical axis is represented by T1, a sum of five air gaps from the first lens element to the sixth lens element along the optical axis is represented by AAG, an effective focal length of the optical imaging lens is represented by EFL, a distance from the image-side surface of the second lens element to the object-side surface of the third lens element along the optical axis is represented by G23, a distance from the image-side surface of the fifth lens element to the object-side surface of the sixth lens element along the optical axis is represented by G56, and the optical imaging lens satisfies the inequalities:

$T1/AAG \geq 1.000$; and $EFL/(G23+G56) \leq 10.000$.

2. The optical imaging lens according to claim 1, wherein a sum of the thicknesses of all six lens elements along the optical axis is represented by ALT, a distance from the image-side surface of the sixth lens element to an image plane along the optical axis is represented by BFL, and ALT and BFL satisfy the inequality:

$ALT/BFL \geq 2.100$.

3. The optical imaging lens according to claim 1, wherein a thickness of the fourth lens element along the optical axis is represented by T4, a thickness of the sixth lens element along the optical axis is represented by T6, and EFL, T4 and T6 satisfy the inequality:

$EFL/(T4+T6) \geq 4.500$.

4. The optical imaging lens according to claim 1, wherein a distance from the object-side surface of the first lens element to the image-side surface of the sixth lens element along the optical axis is represented by TL, a thickness of the third lens element along the optical axis is represented by T3, a thickness of the sixth lens element along the optical axis is represented by T6, and TL, T3 and T6 satisfy the inequality:

$TL/(T3+T6) \geq 4.300$.

5. The optical imaging lens according to claim 1, wherein a distance from the image-side surface of the sixth lens element to an image plane along the optical axis is represented by BFL, and BFL and AAG satisfy the inequality:

$BFL/AAG \leq 1.700$.

6. The optical imaging lens according to claim 1, wherein a thickness of the third lens element along the optical axis is represented by T3, a thickness of the fourth lens element along the optical axis is represented by T4, a thickness of the second lens element along the optical axis is represented by T2, and T3, T4 and T2 satisfy the inequality:

$(T3+T4)/T2 \leq 3.600$.

7. The optical imaging lens according to claim 1, wherein a distance from the image-side surface of the first lens element to the object-side surface of the second lens element along the optical axis is represented by G12, a thickness of the second lens element along the optical axis is represented by T2, a thickness of the third lens element along the optical axis is represented by T3, a distance from the image-side surface of the third lens element to the object-side surface of the fourth lens element along the optical axis is represented by G34, a thickness of the fourth lens element along the optical axis is represented by T4, and T1, G12, T2, T3, G34 and T4 satisfy the inequality:

$(T1+G12+T2)/(T3+G34+T4) \geq 1.700$.

8. An optical imaging lens, comprising a first element, a second element, a third element, a fourth element, a fifth lens element and a sixth lens element sequentially from an object side to an image side along an optical axis, each of the first, second, third, fourth, fifth and sixth lens element having an object-side surface facing toward the object side and allowing imaging rays to pass through and an image-side surface facing toward the image side and allowing the imaging rays to pass through, wherein:
an optical axis region of the image-side surface of the first lens element is convex;
a periphery region of the image-side surface of the fourth lens element is convex;
an optical axis region of the object-side surface of the sixth lens element is concave;
a periphery region of the image-side surface of the sixth lens element is convex;
lens elements having refracting power of the optical imaging lens consist of the six lens elements described above; and
a thickness of the first lens element along the optical axis is represented by T1, a sum of five air gaps from the first lens element to the sixth lens element along the optical axis is represented by AAG, a distance from the object-side surface of the first lens element to an image plane along the optical axis is represented by TTL, an effective focal length of the optical imaging lens is represented by EFL, a distance from the image-side surface of the second lens element to the object-side surface of the third lens element along the optical axis is represented by G23, a distance from the image-side surface of the fifth lens element to the object-side surface of the sixth lens element along the optical axis is represented by G56, and the optical imaging lens satisfies the inequalities:

$T1/AAG \geq 1.000$; and $TTL/T1 \leq 5.100$; and $EFL/(G23+G56) \leq 10.000$.

9. The optical imaging lens according to claim 8, wherein a sum of the thicknesses of all six lens elements along the optical axis is represented by ALT, a thickness of the second lens element along the optical axis is represented by T2, a thickness of the third lens element along the optical axis is represented by T3, and ALT, T2 and T3 satisfy the inequality:

$ALT/(T2+T3) \geq 4.700$.

10. The optical imaging lens according to claim 8, wherein a distance from the image-side surface of the fourth lens element to the object-side surface of the fifth lens element along the optical axis is represented by G45, a thickness of the fifth lens element along the optical axis is represented by T5, and EFL, G45 and T5 satisfy the inequality:

$EFL/(G45+T5) \leq 5.700$.

11. The optical imaging lens according to claim 8, wherein a distance from the object-side surface of the first lens element to the image-side surface of the sixth lens element along the optical axis is represented by TL, a distance from the image-side surface of the sixth lens element to the image plane along the optical axis is represented by BFL, and TL, BFL, G23 and G56 satisfy the inequality:

$(TL+BFL)/(G23+G56) \leq 11.500$.

12. The optical imaging lens according to claim 8, wherein a distance from the image-side surface of the fourth lens element to the object-side surface of the fifth lens element along the optical axis is represented by G45, and AAG, G45 and G56 satisfy the inequality:

$AAG/(G45+G56) \leq 2.500$.

13. The optical imaging lens according to claim 8, wherein a distance from the image-side surface of the fourth lens element to the object-side surface of the fifth lens element along the optical axis is represented by G45, represented by G56, a distance from the image side surface of the second lens element to the and G45, G56 and G23 satisfy the inequality:

$(G45+G56)/G23 \geq 1.000$.

14. The optical imaging lens according to claim 8, wherein a thickness of the fifth lens element along the optical axis is represented by T5, a thickness of the third lens element along the optical axis is represented by T3, a thickness of the fourth lens element along the optical axis is represented by T4, and T1, T5, T3 and T4 satisfy the inequality:

$(T1+T5)/(T3+T4) \geq 2.200$.

15. An optical imaging lens, comprising a first element, a second element, a third element, a fourth element, a fifth lens element and a sixth lens element sequentially from an object side to an image side along an optical axis, each of the first, second, third, fourth, fifth and sixth lens element having an object-side surface facing toward the object side and allowing imaging rays to pass through and an image-side surface facing toward the image side and allowing the imaging rays to pass through, wherein:
the first lens element has positive refracting power;
an optical axis region of the image-side surface of the first lens element is convex;
a periphery region of the object-side surface of the second lens element is convex;
an optical axis region of the image-side surface of the fourth lens element is concave;
a periphery region of the image-side surface of the fourth lens element is convex;
a periphery region of the image-side surface of the sixth lens element is convex;
lens elements having refracting power of the optical imaging lens consist of the six lens elements described above; and
a thickness of the first lens element along the optical axis is represented by T1, a sum of five air gaps from the first lens element to the sixth lens element along the optical axis is represented by AAG, an effective focal length of the optical imaging lens is represented by EFL, a distance from the image-side surface of the second lens element to the object-side surface of the third lens element along the optical axis is represented by G23, a distance from the image-side surface of the fifth lens element to the object-side surface of the sixth lens element along the optical axis is represented by G56, and the optical imaging lens satisfies the inequalities:

$T1/AAG \geq 1.000$; and $EFL/(G23+G56) \leq 10.000$.

16. The optical imaging lens according to claim 15, wherein a sum of the thicknesses of all six lens elements along the optical axis is represented by ALT, a distance from the image-side surface of the first lens element to the object-side surface of the second lens element along the optical axis is represented by G12, and ALT, T1 and G12 satisfy the inequality:

$ALT/(T1+G12) \leq 3.400$.

17. The optical imaging lens according to claim 15, wherein a distance from the object-side surface of the first lens element to the image-side surface of the sixth lens element along the optical axis is represented by TL, a thickness of the second lens element along the optical axis is represented by T2 and TL, T2 and G23 satisfy the inequality:

$TL/(T2+G23) \leq 8.000$.

18. The optical imaging lens according to claim 15, wherein a distance from the image-side surface of the sixth lens element to an image plane along the optical axis is represented by BFL, a distance from the image-side surface of the first lens element to the object-side surface of the second lens element along the optical axis is represented by G12, a distance from the image-side surface of the third lens element to the object-side surface of the fourth lens element along the optical axis is represented by G34, a thickness of the sixth lens element along the optical axis is represented by T6, and BEL, G12, G34 and T6 satisfy the inequality:

$BFL/(G12+G34+T6) \geq 2.100$.

19. The optical imaging lens according to claim 15, wherein a distance from the image-side surface of the fourth lens element to the object-side surface of the fifth lens element along the optical axis is represented by G45, a thickness of the fifth lens element along the optical axis is represented by T5, a distance from the image-side surface of the third lens element to the object-side surface of the fourth lens element along the optical axis is represented by G34, a thickness of the fourth lens element along the optical axis is represented by T4, and G45, T5, G34 and T4 satisfy the inequality:

$(G45+T5)/(G34+T4) \geq 1.700$.

* * * * *